United States Patent [19]

Timm et al.

[11] Patent Number: 5,344,871
[45] Date of Patent: Sep. 6, 1994

[54] METHOD OF MAKING BINDER FROM NATURALLY OCCURRING AGRICULTURAL PRODUCTS

[75] Inventors: Delmar C. Timm; Ayodeji Ayorinde, both of Lincoln; Harold E. Egger, Hickman, all of Nebr.

[73] Assignee: The Board of Regents of the University of Nebraska, Lincoln, Nebr.

[21] Appl. No.: 954,740

[22] Filed: Sep. 29, 1992

Related U.S. Application Data

[60] Division of Ser. No. 659,453, Feb. 21, 1991, Pat. No. 5,153,242, which is a continuation of Ser. No. 511,833, Apr. 13, 1990, abandoned, which is a continuation of Ser. No. 173,921, Mar. 28, 1988, abandoned, which is a continuation of Ser. No. 144,663, Jan. 12, 1988, abandoned, which is a continuation of Ser. No. 712,518, Mar. 18, 1985, abandoned.

[51] Int. Cl.$^5$ .................. D01B 1/08; C05F 11/08; B02C 7/18
[52] U.S. Cl. .................. 525/54.3; 525/54.31; 527/300; 71/23; 71/24; 71/25; 71/64.04; 71/64.13; 241/6; 241/11; 241/27; 241/28
[58] Field of Search .......... 525/54.3, 54.31; 527/300; 71/23, 24, 25, 64.04, 64.13; 106/162; 127/34; 241/6, 11, 27, 28

[56] References Cited

U.S. PATENT DOCUMENTS

| | | | |
|---|---|---|---|
| 2,745,748 | 5/1956 | McCashen | 241/6 |
| 2,957,632 | 10/1960 | Sullivan et al. | 241/6 |
| 3,399,839 | 9/1968 | Anderson et al. | 241/11 |
| 4,204,005 | 5/1980 | Kudo | 241/6 |
| 4,670,944 | 6/1987 | Thrash | 241/11 |

OTHER PUBLICATIONS

Nitikin "The Chemistry of Cellulose and Wood" Academy of Sciences of the USSR, 1966, pp. 62-71.

*Primary Examiner*—Nathan M. Nutter
*Attorney, Agent, or Firm*—Vincent L. Carney

[57] ABSTRACT

To form a binder from naturally occurring products without extraction or purification steps, the binder utilizes proteins from the germ or endosperm of cereal grasses or from the seed of buckwheat, oil seed plants, Amaranthus or leguminous plants or from leaves. The protein has a thermoplastic microstructure with linear polymers of moleculer weight of at least 2,000 linked with peptide linkages of at least 50 in number. The naturally occurring product is ground or milled without further processing and thus includes carbohydrates, particularly as cellulose, and possibly fats, yeast or materials yielding ash upon burning, with the carbohydrates being at least 5 percent of the proteins by weight. The binder may include some initiators or catalysts to polymerize fats or other initiators or catalysts to polymerize proteins. Structures formed using the binder may be made from naturally occurring agricultural products with the protein already in them, or in the alternative, the binder may be mixed with filler material and water from other sources.

3 Claims, 1 Drawing Sheet

METHOD OF MAKING BINDER FROM NATURALLY OCCURRING AGRICULTURAL PRODUCTS

REFERENCE TO RELATED APPLICATIONS

This application is a division of U.S. application Ser. No. 07/659,453 for COMPOSITION BOARD INCLUDING PLANT PROTEIN IN BINDER by Delmar C. Timm, et al., filed Feb. 21, 1991 and now U.S. Pat. No. 5,153,242, which is a continuation of U.S. application Ser. No. 07/511,833, filed Apr. 13, 1990 and now abandoned, which is a continuation of U.S. application Ser. No. 07/173,921, filed Mar. 28, 1988, which is a continuation-in-part of U.S. application Ser. No. 07/144,663, filed Jan. 12, 1988 and now abandoned, which is a file wrapper continuation of U.S. application Ser. No. 06/712,518, filed Mar. 18, 1985 and now abandoned, and assigned to the same assignee as this application.

BACKGROUND OF THE INVENTION

This invention relates to binders and structures made using binders.

In one class of binder, naturally occurring agricultural products are processed to remove materials usable as binders for either naturally occurring products or synthetic products. In one class of structure formed using binders, naturally occurring agricultural products are included as filler such as the case of composition board and other structures.

In a prior art type of binder of this class, the carbohydrates or lignin materials from the stalks or foliage of plants are removed from the plant and processed to form a binder. For example, in G.E. Hartford, "Production of Insulating Board from Cornstalks" *Industrial and Engineering Chemistry* v. 22, number 12, pp. 1280–1289, December 1930, it is suggested that pentosan sugars be removed from cornstalk pulp and used as adhesive.

It is also known to use agricultural materials or wood materials or materials processed from them: (1) to make structural members without adding a binder; (2) to use them as filler for composite structures such as composition board; and (3) to maker larger structural members such as is the case with plywood. For example, in Boehm, Robert M. "The Masonite Process", *Industrial and Engineering Chemistry*, v. 22 number 5, pp. 493–497, (May 1930), a process is described in which wood fibers are exploded from the wood and then are formed into Masonite boards under pressure and steam without chemical additives.

These prior art binders, methods of making them, methods of using them and structures made with them have disadvantages in that they are relatively expensive because of the excessive processing necessary for their use. Moreover, many of the structures absorb excessive amounts of moisture and possess inadequate mechanical properties.

SUMMARY OF THE INVENTION

Accordingly, it is an object of the invention to provide an improved binder.

It is a further object of the invention to provide an improved method for forming binders.

It is a still further object of the invention to provide an improved composite structure formed with the aid of binders.

It is a still further object of the invention to provide an improved method of making structures using binders.

It is a still further object of the invention to provide an inexpensive binder made from waste materials such as stillage or the like.

It is a still further object of the invention to provide an improved composite board made of naturally occurring products with very little processing using binders already in the naturally occurring products.

It is a still further object of the invention to provide a particularly inexpensive composition board from agricultural products.

In accordance with the above and further objects of the invention, one embodiment of a binder includes naturally occurring plant proteins and carbohydrates, with the proteins having a thermoplastic microstructure with linear polymers of molecular weight of at least 2000 linked with peptide linkages of at least 50. The carbohydrates are at least 5 percent of the proteins by molecular weight. Additives may be incorporated to aid in the polymerization of the proteins.

In one embodiment, lipids are included and in this embodiment an initiator which causes polymerization of the lipids is also included. The initiators to cause the polymerization may include reactive arms. In this circumstance, the initiator may be selected to have arms of a length and type that improve both chemical and physical properties. Other reactive monomers may be included to aid in reacting the protein.

In another embodiment requiring higher temperatures and/or pressures, the binder relies principally upon naturally occurring plant lipids rather than protein and need not have significant protein. In this embodiment, the carbohydrates are at least 5 percent of the lipids by molecular weight.

In using the binder, structures are adhered together by penetration of the surface and polymerization and/or to some extent chemical reactions with the surfaces, particularly in the case of cellulose products, and/or by temporary alteration of the protein molecule structure to a form that engages the surface followed by another alteration to cause binding. Composition board may be made using the binder.

One form of composition board includes only naturally occurring agricultural products having protein from the germ seed and/or foliage and having filler from foliage, stems or the like from the same plant. There is in this embodiment a sufficient amount of protein for binding such as by polymerization through reactions of the peptide (or amide) and/or carboxyl groups.

In this embodiment, a pressure of at least 50 psi and 200 degrees Fahrenheit is applied for a sufficient time to alter the molecular structure such as by causing polymerization of the protein. No chemical additives are necessary but it is useful to include sufficient water to increase heat transfer for uniform temperature and to render the protein sufficiently flexible or mobile to come into intimate contact with and flow around the contours of surfaces to be bound together.

The time for application of pressure and heat must be long enough to permit temperature to become substantially uniform in the material and to cause reactions of the amide or carboxyl group. The exact value in some instances can be determined by experimentation, but is at least one second, and longer unless a non-conventional method of heat is used such as ultraviolet radiation.

To determine the desired density, a measured quantity of uncured material is subjected to different pressures until the proper density is achieved. The density is determined by any suitable method including those specified in ASTM standard ASTM D 1037-78 found in the 1981 Annual Book of ASTM Standards Part 22. Similarly, modulus of elasticity, modulus of rupture and percentage of thickness change with water absorption are determined by using samples and varying pressure, time and temperature and testing by ASTM D 1037-78 described above until the proper values are found.

In other embodiments, additives cause further polymerization by reacting with the proteins to a higher degree. Oxiranes having a molecular weight of between 50 and 1000 used without a solvent or oxiranes having a molecular weight of between 50 and 3000 used with a solvent are suitable for this purpose and react with the amine groups of the proteins. The binder may be formed either from whole grain or defatted grain, with the oils being used for other purposes or other by-products such as stillage from alcohol plants including the yeast. More generally it should include plant protein such as from the germ and/or endosperm of cereal grasses, oil seed plants or buckwheat seed or the seed of leguminous plants or from foliage of certain protein foliage plants or from Amaranthus or certain Xerophytic plants such as Partheium argentatum.

DESCRIPTION OF THE DRAWINGS

The above noted and other features of the invention will be better understood from the following detailed description when considered with reference to the accompanying drawings, in which.

DETAILED DESCRIPTION

Figure 1:
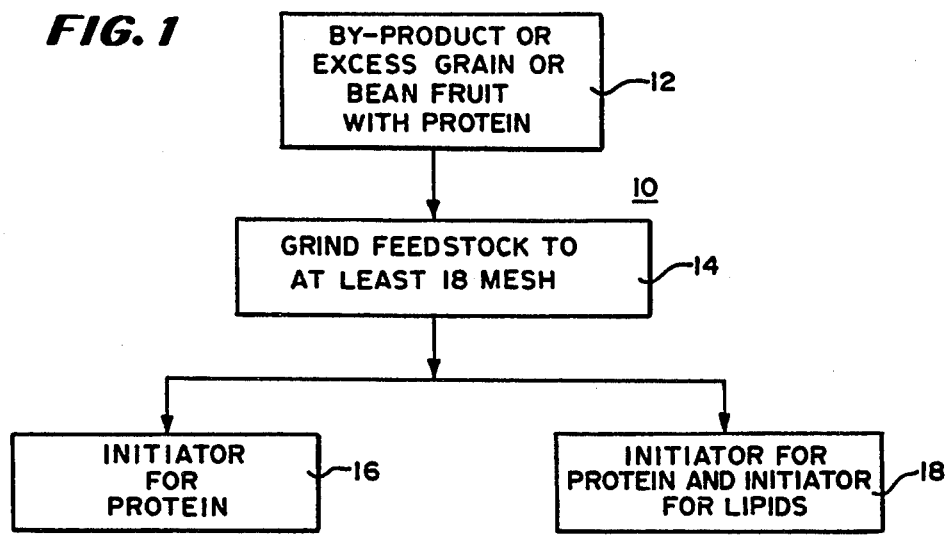
FIG. 1 is a block diagram of a process for making binder.

Broadly, a binder includes naturally occurring proteins and/or lipids in agricultural products. The proteins may have a thermoplastic microstructure with linear polymers of molecular weight of a least 2000 linked with peptide linkages of at least 50 in number and usually will include carbohydrates and oils naturally occurring in the same agricultural product as the protein, with the carbohydrates being at least 5 percent of the protein by molecular weight. The lipids, carbohydrates and proteins may be removed in some applications for other commercial use, leaving at least lipids or protein as a principal part of the binder.

In one embodiment, the binder contains substantial lipids as well as the proteins, and in this embodiment an initiator capable of causing reactions at the double bonds of the lipid upon the application of heat is mixed with the binder. The protein may be polymerized with a step-type reaction and the degree of free, unreacted lipids reduces the modulus of elasticity while the polymerized lipids and protein increase the modulus of elasticity, thus permitting control over the modulus of elasticity in some embodiments. In another embodiment, either with an initiator for the lipids or without such an initiator and either with lipids present or without, compounds may be added which react with the amide and/or carboxyl groups of the proteins to form larger polymers or which serve as catalysts for such reactions such as to increase the degree of polymerization. Such compounds are in this description referred to as protein reactants. In one embodiment, the protein reactant is an oxirane.

In still another embodiment, a binder includes naturally occurring lipids in agricultural products and may or may not have substantial protein but rely upon changes in the lipids for adhesion in use. This embodiment may also include carbohydrates naturally occurring in the same agricultural product as the protein, with the carbohydrates being at least five percent of the lipids by molecular weight.

In one embodiment, grain stillage having a water content by weight of between 40 and 60 percent and a protein and a protein content of between 20 and 80 percent is mixed with a protein reactant no greater than one-fifth of the total weight of the binder mixture, and under some circumstances with no reactant the mixture is used with fiber of at least equal in weight to the binder. This embodiment may be used to aid in the formation of brickets of waste material such as garbage for storage and eventual burning.

In another related embodiment, the protein reactant of the stillage should be in the range of 20 to 80 percent of the weight of the total binder mixture and the protein reactant in the range of 10 to 70 percent by weight of the binder. The filler may be sawdust wood chips or other fiber useful in commercial particle board in the range of 50 to 200 percent by weight of the entire mixture and the water will be in the range of 15 to 60 percent of the weight of the entire mixture.

In another embodiment, particle board is formed with a suitable fiber, water and a binder of a grain or grain part. The binder includes both grain proteins and protein reactant such as oxirane in a ratio of protein reactant to protein within the range of ½ to 4. The cure time should be in a range of 1 to 6 hours at a temperature of between 195 degrees Celsius to 140 degrees Celsius, with one hour being used at 195 degrees and corresponding longer times for lower temperatures. The amount of water should be in the range of ⅛ to ⅓ the total weight of the mixture and the binder should be in the range of between ¼ to ½ the total weight of the mixture.

Advantageously, the initiators or catalysts may be selected to react with the proteins or lipids at temperatures lower than those required for the initiators to react with carbohydrates and substantially the same as the temperatures necessary to make the proteins or lipids react among themselves to form larger polymers.

In embodiments in which the binder is being used to bind with solid surfaces rather than with a filler material to form composition board, the temperatures may be slightly different to permit a greater amount of chemical binding with the structures such as the cellulose of wood or the like while maintaining the polymerization action forming the bonds. In each of these cases, the initiators are added and maintained at a temperature lower than the temperature at which they react so that the reaction may be delayed until the binder is used.

In FIG. 1, there is shown a flow diagram 10 of a general process for making a binder including: (1) the step 12 of providing a source of by-product or excess grain, bean fruit or leaves containing protein as afeedstock; (2) the step 14 of grinding the feedstock to reduce its size to smaller than 18 mesh; and (3) either of two alternate steps 16 or 18. The step 16 is the step of adding a catalyst, protein reactant, reactive monomer for increasing the activity of the protein and the step 18 is the step of adding a catalyst or reactive monomer for cross-linking the protein and/or an initiator for polymerization of the lipids. The word "grain", in this application, is used in its general sense to include not only the seeds of cereal grasses or buckwheat but also the fruit of other plants which are leguminous such as beans. An example of a by-product is grain stillage.

While there are variations in the methods of making the binder, the general steps of the preferred embodiment are the same and they include first the step of obtaining the feedstock in adequate quantities and then grinding the feedstock after it has been obtained followed by either one of two steps depending on whether the feedstock has been defatted. If the feedstock has been defatted, then the process includes step 16 of adding a catalyst, protein reactant or reactive monomer for cross linking the protein, but if the feedstock has not been defatted, then additives, such as initiators, catalysts, protein reactants and reactive monomers are added for both the protein and for the lipids. The binder may then be packaged for later use. In some limited application, only the lipids, an initiator, fiber and water may be used, thus relying only on chain polymerization of the lipids.

The step 12 of obtaining a feedstock includes the step of obtaining any high protein agricultural product such as corn, sorghum or soybean which has within its germ or bean a protein capable of cross linking as a binder. While the grain or bean itself with all of its materials may be utilized, advantageously, the grain or bean may be used for other purposes first and the by-products used to make binder under some circumstances. For example, grains which have had the starch removed in the process of forming alcohol or defatted corn germ in which the oil has been sold as a by-product may be used to make binder.

For example, the fruit of the corn includes a germ portion which is high in one type of proteins and a storage portion with other proteins all encased in a cellulose portion. In the preferred embodiment, protein must be present but the lipids, the cellulose and the material resulting in ash if burned or some carbohydrates may be removed. In practice, the lipids may be used in other processes or removed for sale as a vegetable oil and in the case of stillage (a distillation waste), the germ may be spent leaving storage protein and lipids in the endosperm.

Prior to converting the feedstock into a binder, it should be ground to a consistency, the particle size of which readily blends to form a colloidal solution for better adherence to the members that are to be bound together. In its simplest form this is a grinding operation which reduces the feedstock to a size at least as low as 18 mesh and may be coupled with a straining or filtering operation as well as with dissolving type operations. In more complex formulations, collidol suspensions or emulsion may be used. The grinding may be by standard milling equipment or any other means suitable to create a consistency for the particular application. The binder must be finer for use as a binder for large pieces such as the formation of plywood than for composite board. The binder can be stored and when appropriate mixed with water and used.

Although protein binders do not require an initiator, they may be improved with an additive that enhances the cross linking mechanism. To form a binder principally of protein but including an additive, an additive which forms amide cured epoxys and polyamide is an especially desired additive and can be added but not permitted to react until the binder is in use. A suitable additive is an oxirane, the activity of which is initiated by other forms of energy, such as light, or heat. In this specification, oxiranes means hydrocarbon molecules having oxirane (epoxide) groups and being generally linear or branched.

The oxirane used in this embodiment preferably has at least an oxirane group on the ends of each molecule to provide multiple connections to proteins and should have, if used without a solvent or without being emulsified in water, a molecular weight of between 50 and 1000. Higher molecular weight oxiranes such as up to 3000 may be used if dissolved or emulsified before being combined. Preferably, oxiranes within the molecular weight of 50 through 1000 are used without a solvent or without being emulsified. A suitable oxirane is sold by Shell Chemical Company, 1 Shell Plaza, Houston, Tex. 77002, under the designation Epon 828. Other suitable oxirane may be obtained from the same or other sources.

This type of reactive monomer causes cross inking with the free hydrogen in the peptide linkage of the protein. Other compounds with bifunctional groups on each end to react with the same hydrogen may be used and the longer the group, the less rigid the material is likely to be. However, the cross linking may be directly between peptide groups at the free hydrogen of the peptide group. Moreover, initiators or catalysts or monomers which react with the carboxyl and hydroxyl groups may also be used.

Another compound that has been found to work is hydantoin (glycolurea) sold by Ciba-Geigy Corporation, Dyestuffs and Chemicals Division, Greensboro, N.C. as C.G. SQ238. It is also known that resorcinol (3, hydroxyphenol or m-dehydroxybenzene) and certain isocynates, hindered isocynates and diisocynates are usable as cross-linking agents but they have not been tested. An additional list of potential chemicals that are known to be co-reactive for protein is discussed by John Bjorkoten in "Advances in Protein Chemistry," edited by M. L. Anson et al, Academic Press 1951, pp 343–381.

The maximum temperature of storage varies from formulation to formulation (depending on the quantity and type of catalyst, reactive monomer or initiator used) and with materials not having initiators, catalysts or reactive monomers and those that do. For binders not having an initiator, temperatures below 250 degrees Fahrenheit do not usually cause the binder to cross link and thus do not bind unless raised above the cross-linking temperature.

With initiators, protein reactants, reactive monomers and catalysts, storage temperature varies. It depends on the type and quantity used but preferably it should be less than 150 degrees Fahrenheit for protein additive and possibly less than 200 degrees Fahrenheit for lipid polymerization.

With initiators, protein reactants, reactive monomers and catalysts, the range is normally below 250 degrees Fahrenheit with the upper range being determined by the flash point of the particular additive, the threshold temperature for reactive monomers or by the half life of initiators used to cross link lipids. Storage life may also be extended, if reactants are selectively blended into two or more parts initially, which are then mixed prior to use. One part may be rich in protein, and the second being a monomer that reacts with the protein.

In addition to the ability to polymerize, the binder may have the ability to bind to the particles or members being attached by chemical reactions. The binder may attach by mechanical adhering or by permeation into the members to be bound because of its mobility as a lower molecular-weight protein and polymerization to a higher molecular weight to form a binder to hold the members. Thus, it may permeate into the members, and by polymerization, form a solid bond between the members. Additionally, a chemical reaction may take place between the binder and the material to be bound and the protein molecule may become altered in configuration with heat and plasticizers such as water permeate the surface and upon cooling become more dense and bind the surface.

Temperature alone may be the initiator of polymerization and nothing added to the protein. The basic mer of the protein in the embryo is—(NHCHRCO—)n representing a structure of a polyamide or polypeptide. Thus the protein polymer length may be further increased by initiators and reactive monomers to form a binder but also at high temperatures may be denatured resulting into other reactive components such as glutamic acid, leucine, alanine, proline and tyrosine, each having different chemical branches, some saturated and some unsaturated.

At higher temperatures, some bonding may be made with cellulose of waste agricultural materials such as, for example, bonding between the glutamic acid and the cellulose to form an ester. Binding between cellulose and other materials and polymerization may both apply when reactive monomers, initiators or catalysts are used so that at high temperatures, the protein is denatured, and then the additive operates to polymerize some bonds while others are formed by the high temperature creating chemical bonding with the material.

Some initiators that have proved effective are: (1) dicumyl peroxide which is effective at 280 degrees Fahrenheit; and (2) Lupersol ((2,5 dimethyl, 2,5 (T-butylperoxy) hexane) at 300 degrees Fahrenheit, which are available from the Lucidol Division of Wallace and Tiernan Inc., 1740 Military Road, Buffalo, N.Y. 14240. That organization also sells many other initiators, catalysts and reactive monomers such as peroxides. It is believed that peroxides are generally usable and compounds of this class are listed in Table 1 of the publication "Evaluation of Organic Peroxides From Half-Life Data" incorporated herein and available from the aforementioned Lucidol Division.

Some oil in a principally protein binder product may have a plasticising effect and uncontrolled amounts of the lipids may cause unpredictable modulus of elasticity, low and unpredictable strength and other unpredictable characteristics. Consequently, if lipids remain in the raw material, they should be polymerized to provide further binding and product stability.

Because the lipids or fats in the agricultural products are principally semi-dry oils, they must be chemically altered by initiators for effective polymerization. The initiators for this purpose are relatively expensive and so an economically synergistic process is to purchase defatted grain and utilize only the protein. This is economical because the oils are a valuable part of the grain and may readily be sold. Indeed, defatted grain is available on the market as a waste product, as well as from sources such as distillary grains from alcohol production which utilizes principally the starches of the grain, as processed meals from defatted soybeans, corn germ, peanuts, sunflowers or flax.

When the grain is not defatted, in addition to polymerizing the protein, the fats must be polymerized. This is done primarily by polymerization reactions which are: (1) chain-growth reactions of the vinyl groups on the oils using an initiator; (2) condensation protein transesterification reactions with the alcohol groups of cellulose; (3) step-growth amidization reactions with such protein units as lysine or arginine; or (4) step-growth esterification reactions with hydroxyproline. Condensation polymerization is sometimes referred to as step-reaction or step-growth polymerization or reactions.

Many of the oils in plant germ are semi-drying oils such as, monoglycerides, diglycerides or triglycertdes. The unsaturated oil is primarily composed of oleic with some linoleic acid. After hydrolysis, a carboxyl group Is formed which permits polymerization or polymertzations may be transesterifications. An initiator may be used for the polymerization of the glycerides such as the peroxides mentioned above, including particularly Lupersol (2,5 dimethyl , 2,5 (T-butylperoxy) hexane)).

After formation of the binder, it is stored under conditions that prevent polymerization until use. Normally storing it at a cool temperature below the activity range of the additives or polymerization point of the protein tn containers which shield it from light will permit a relatively long storage life. For ambient reactive chemical additives, formulations in two or more containers may be stored and blended at the time of the formation of the binder.

The binders may be used to: (1) form composition board of relatively small particles, a large number of which are bound together into the board; or (2) adhere a few large items together. For composition board, the filler may be of many types but in one special embodiment, the filler and the protein, with or without oil, are naturally occurring together such as in the case of corn germ and corn refuse such as cornstalks. In this embodiment, as the compression and temperature increase, polymerization of the protein and/or oils occurs to form a binder for the cornstalks and thus a composition board is formed. Other boards may be formed with separate binder and any natural or synthetic filler, with a binder being of any of the types described above such as only protein, protein with an initiator catalyst or reactive monomer and protein with or without these additives together with lipids using an initiator for polymerization. The binder is not higher than 30 percent of weight to the filler in composition board.

Figure 2:
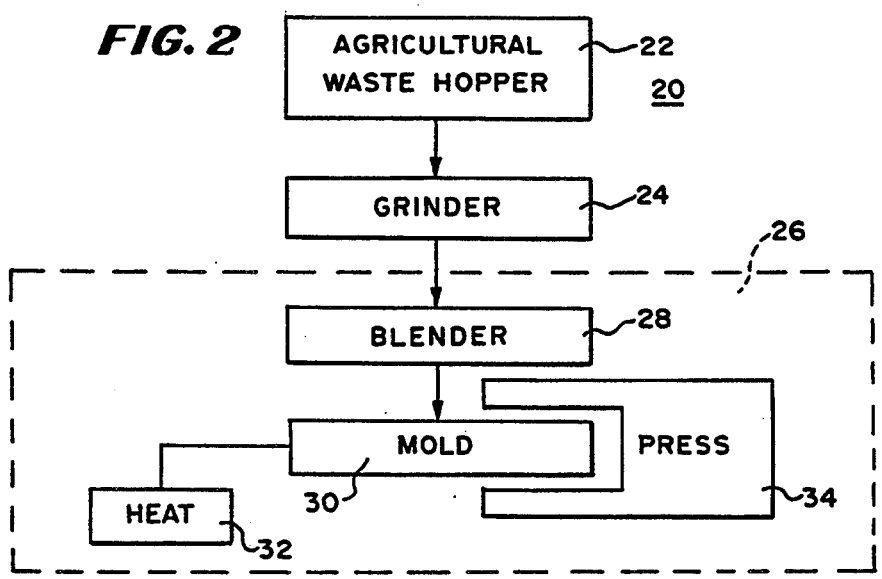
FIG. 2 is a simplified schematic diagram of the process of using the binder.

In FIG. 2, there is shown a simplified version of an apparatus 20 for forming structures using binder having an agricultural waste hopper 22, a grinding or milling apparatus 24 and a composition board forming apparatus 26. The agricultural waste hopper may include agricultural waste or any other filler. The grinder 24 prepares it to the consistency required for the molding operation 26. The binder, when added, may be combined with the filler in the forming apparatus 26. Agricultural waste which includes protein to be used as a binder may be prepared in the grinder without adding binder.

The forming apparatus 26 includes a blender 28, a molding apparatus 30, a source of heat 32 and a pressing apparatus 34. The blender 28 may not be needed where binder is not added but is already part of an agricultural product used as the filler and the heater 32 may be eliminated if pressure from the press 34 is adequate to generate sufficient heat to cause polymerization in the mold 30.

In operation, the agricultural or other waste in the agricultural waste hopper 22 is ground to the proper consistency in the grinder 24, and if a binder is to be used, the binder is mixed into it. Water is blended into it in a sufficient amount to provide heat transfer, and alter the protein with heat to increase binding upon drying. The mixture is then applied to the mold 30 which may be a die for a structural shape such as a sculptured item made one-by-one in a single mold or may be a continuous conveyor mold to form sheets such as is the case with some composition board.

In the mold 30, pressure and supplementary heat, if necessary, is applied to reach the temperature for polymerization of the protein. The higher of the temperatures for the polymerization of lipids or proteins is used in accordance with the nature of the binder and additive. The heat and water also increase the mobility of the protein and enable it to better form around the binding surfaces. Thus, when cooled and dried, the protein becomes vitrified and also binds to the surface via primary or secondary bonds.

An optimum formulation for soybean is 100 parts of fiber, 50 parts of water, 50 parts of defatted bean and 20 parts of oxirane cured at 165 degrees Celsius for 5 hours. If the cure temperature is higher than 165 degrees Celsius, the cure time can be reduced. If the cure temperature is below 165 degrees Celsius, more than 5 hours is required to produce a high quality particle board.

EXAMPLES

The following non-limitative examples illustrate the invention.

GENERAL CONDITIONS

The samples of board were tested in each case using the methods specified in ASTM standard ASTM D 1037-78 found in the 1981 Annual Book of ASTM Standards Part 22. Testing was done at the University of Nebraska under the supervision of Dr. William Splinter, Professor and Head of Agricultural Engineering.

In some cases, the speciman being tested was not long enough to satisfy the length to thickness ratio needed to meet the ASTM specifications. With this type of specimen, a commercial board was tested using ASTM standards and then smaller sizes of the commercial board were tested which conformed in dimensions to the specimen. A comparison was used in such cases to provide guidelines to determine values. The units are in hours, parts by weight and either Fahrenheit or Celsius as specified.

EXAMPLE 1

One hundred parts of corn germ were ground to 18 mesh and mixed with 50 parts of water and 100 parts of corn fiber. A board was made and cured at a temperature of 330 degrees Fahrenheit for 1.5 hours in an aluminum mold. The board was tested as described in the general procedures. The results are shown in Table 1.

EXAMPLE 2

Eighty parts of corn germ were ground to 18 mesh and mixed with 50 parts of water and 100 parts of corn fiber. A board was made and cured at a temperature of 330 degrees Fahrenheit for 1.5 hours in an aluminum mold. The board was tested as described in the general procedures. The results are shown in Table 1.

EXAMPLE 3

Sixty parts of corn germ were ground to 18 mesh and mixed with 50 parts of water and 100 parts of corn fiber. A board was made and cured at a temperature of 330 degrees Fahrenheit for 1.5 hours in an aluminum mold. The board was tested as described in the general procedures. The results are shown in Table 1.

TABLE 1

| Effect of Increasing Germ On Mechanical Properties | | | | | | |
|---|---|---|---|---|---|---|
| Stover lb | Water lb | Germ lb | Elastic MOD (PSI) | Rupture MOD (PSI) | Specific Gravity | % Thickness Change |
| 100 | 50 | 100 | 86,129 | 894 | 0.76 | 36.4 |
| 100 | 50 | 80 | 86,401 | 760 | 0.73 | 32.8 |
| 100 | 50 | 60 | 82,441 | 910 | 0.76 | 44.3 |
| 100 | 50 | 50 | 60,457 | 751 | 0.75 | 31.0 |
| 100 | 50 | 40 | 69,454 | 803 | 0.76 | 25.0 |

EXAMPLE 4

Fifty parts of corn germ were ground to 18 mesh and mixed with 50 parts of water and 100 parts of corn fiber. A board was made and cured at a temperature of 330 degrees Fahrenheit for 1.5 hours in an aluminum mold. The board was tested as described in the general procedures. The results are shown in Table 1.

EXAMPLE 5

Forty parts of corn germ were ground to 18 mesh and mixed with 50 parts of water and 100 parts of corn fiber. A board was made and cured at a temperature of 330 degrees Fahrenheit for 1.5 hours in an aluminum mold. The board was tested as described in the general procedures. The results are shown in Table 1.

EXAMPLE 6

One hundred parts of fiber are combined with 50 parts of corn germ milled to at least 18 mesh and 50 parts of water together with 3 parts of oxirane (epon 828). A board was made of the paste and it was cured at 330 degrees Fahrenheit for 1.5 hours. It was then tested for mechanical ability in accordance with the general testing procedures above and the results are shown in Table 2.

EXAMPLE 7

One hundred parts of fiber are combined with 50 parts of corn germ milled to at least 18 mesh and 50 parts of water together with 5 parts of oxirane (epon 828). A board was made of the paste and it was cured at 330 degrees Fahrenheit for 1.5 hours. It was then tested for mechanical ability in accordance with the general testing procedures above and the results are shown in Table 2.

EXAMPLE 8

One hundred parts of fiber are combined with 50 parts of corn germ milled to at least 18 mesh and 50 parts of water together with 3.0 parts of oxirane (epon 828). A board was made of the paste and it was cured at 330 degrees Fahrenheit for 1.5 hours. It was then tested for mechanical ability in accordance with the general testing procedures above and the results are shown in Table 2.

TABLE 2

Effect of Increasing Oxirane Content On Mechanical Properties

| Sawdust lb | Water lb | Germ lb | Oxirane lb | Elastic MOD (PSI) | Rupture MOD (PSI) | Specific Gravity | % Thickness Change |
|---|---|---|---|---|---|---|---|
| 100 | 50 | 50 | 3 | 121,613 | 1,150 | 0.76 | 13.3 |
| 100 | 50 | 50 | 5 | 128,717 | 1,542 | 0.76 | 15.7 |
| 100 | 50 | 50 | 10 | 151,906 | 1,646 | 0.77 | 12.0 |
| 100 | 50 | 50 | 15 | 106,030 | 1,542 | 0.79 | 10.7 |
| 100 | 50 | 50 | 20 | 126,143 | 1,099 | 0.78 | 12.0 | water were mixed with 3 parts of peroxide (Lupersol) and cured at 330 degrees Fahrenheit for 1.5 hours. The board made in this manner was tested in accordance with the general testing procedures above and the results are shown in Table 3.

TABLE 3

Optimization of Initiator

| Sawdust lb | Germ lb | Water lb | Initiator lb | Elastic MOD (PSI) | Rupture MOD (PSI) | Specific Gravity | % Thickness Change |
|---|---|---|---|---|---|---|---|
| 100 | 50 | 50 | 1 | 91,322 | 956 | 0.74 | 21.0 |
| 100 | 50 | 50 | 2 | 104,242 | 900 | 0.75 | 16.8 |
| 100 | 50 | 50 | 3 | 94,447 | 1,050 | 0.73 | 18.8 |
| 100 | 50 | 50 | 4 | 61,022 | 745 | 0.74 | 19.3 |
| 100 | 50 | 50 | 6 | too soft | too soft | 0.75 | 19.0 |

EXAMPLE 9

One hundred parts of fiber are combined with 50 parts of corn germ milled to at least 18 mesh and 50 parts of water together with 15 parts of oxirane (epon 828). A board was made of the paste and it was cured at 330 degrees Fahrenheit for 1.5 hours. It was then tested for mechanical ability in accordance with the general testing procedures above and the results are shown in Table 2.

EXAMPLE 10

One hundred parts of fiber are combined with 50 parts of corn germ milled to at least 18 mesh and 50 parts of water together with 20 parts of oxirane (epon 828). A board was made of the paste and it was cured at 330 degrees Fahrenheit for 1.5 hours. It was then tested for mechanical ability in accordance with the general testing procedures above and the results are shown in Table 2.

EXAMPLE 11

One hundred parts of fiber combined with 50 parts of corn germ ground to at least 18 mills and 50 parts of water were mixed with 1 part of peroxide (Lupersol) and cured at 330 degrees Fahrenheit for 1.5 hours. The board made in this manner was tested and the results are shown in Table 3.

EXAMPLE 12

One hundred parts of fiber combined with 50 parts of corn germ ground to at least 18 mills and 50 parts of water were mixed with 2 parts of peroxide (Lupersol) and cured at 330 degrees Fahrenheit for 1.5 hours. A board was made and cured at a temperature of 330 degrees Fahrenheit for 1.5 hours in an aluminum mold. The board made in this manner was tested in accordance with the general testing procedures above and the results are shown in Table 3.

EXAMPLE 13

One hundred parts of fiber combined with 50 parts of corn germ ground to at least 18 mills and 50 parts of

EXAMPLE 14

One hundred parts of fiber combined with 50 parts of corn germ ground to at least 18 mills and 50 parts of water were mixed with 4 parts of peroxide (Lupersol) and cured at 330 degrees Fahrenheit for 1.5 hours. The board made in this manner was tested in accordance with the general testing procedures above and the results are shown in Table 3.

EXAMPLE 15

One hundred parts of fiber combined with 50 parts of corn germ ground to at least 18 mills and 50 parts of water were mixed with 6 parts of peroxide (Lupersol) and cured at 330 degrees Fahrenheit for 1.5 hours. The board made in this manner was tested in accordance with the general testing procedures above and the results are shown in Table 3.

EXAMPLE 16

One hundred parts of sawdust were mixed with 50 parts of corn germ and 50 parts of water and 10 parts of oxirane and 1 part of Lupersol. A board was made and cured at a temperature of 330 degrees Fahrenheit for 1.5 hours in an aluminum mold. The board made according to this process was tested in accordance with the general testing procedures above. The results are shown in Table 4.

EXAMPLE 17

One hundred parts of sawdust were mixed with 50 parts of corn germ and 50 parts of water and 10 parts of oxirane and 2 parts of Lupersol. A board was made and cured at a temperature of 330 degrees Fahrenheit for 1.5 hours in an aluminum mold. The board made according to this process was tested in accordance with the general testing procedures above. The results are shown in Table 4.

EXAMPLE 18

One hundred parts of sawdust were mixed with 50 parts of corn germ and 50 parts of water and 10 parts of oxirane and 3 parts of Lupersol. A board was made and cured at a temperature of 330 degrees Fahrenheit for 1.5 hours in an aluminum mold. The board was tested in accordance with the general testing procedures above. The results are shown in Table 4.

TABLE 4

Simultaneous Polymerization of Oil and Protein

| Sawdust lb | Germ lb | Water lb | Oxirane lb | Initiator lb | Elastic MOD (PSI) | Rupture MOD (PSI) | Specific Gravity | % Thickness Change |
|---|---|---|---|---|---|---|---|---|
| 100 | 50 | 50 | 10 | 1 | 93,131 | 1,168 | 0.77 | 7.45 |
| 100 | 50 | 50 | 10 | 2 | 79,162 | 1,127 | 0.74 | 11.10 |
| 100 | 50 | 50 | 10 | 3 | 96,109 | 1,035 | 0.76 | 10.95 |
| 100 | 50 | 50 | 10 | 4 | 135,153 | 1,289 | 0.76 | 11.04 |
| 100 | 50 | 50 | 10 | 5 | 83,313 | 980 | 0.78 | 9.52 |

EXAMPLE 19

One hundred parts of sawdust were mixed with 50 parts of corn germ and 50 parts of water and 10 parts of oxirane and 4 parts of Lupersol. A board was made and cured at a temperature of 330 degrees Fahrenheit for 1.5 hours in an aluminum mold. The board made was tested in accordance with the general testing procedures above. The results are shown in Table 4.

EXAMPLE 20

One hundred parts of sawdust were mixed with 50 parts of corn germ and 50 parts of water and 10 parts of oxirane and 5 parts of Lupersol. A board was made and cured at a temperature of 330 degrees Fahrenheit for 1.5 hours in an aluminum mold. The board made according to this process was tested in accordance with the general testing procedures above. The results are shown in Table 4.

EXAMPLE 21

A simulated mixture of a partly defatted corn germ was prepared by extracting protein and fat and mixing it to arrive at 100 parts sawdust, 50 parts of the defatted corn germ, 50 parts of water, 10 parts of the oxirane and no oil at all. A board was made and cured at a temperature of 330 degrees Fahrenheit for 1.5 hours in an aluminum mold. The board was tested in accordance with the general testing procedures above and the results are shown in Table 5.

EXAMPLE 22

A simulated mixture of a partly defatted corn germ was prepared by extracting protein and fat and mixing it to arrive at 100 parts sawdust, 50 parts of the defatted corn germ, 50 parts of water, 10 parts of the oxirane and 9.6 parts of oil. A board was made and cured at a temperature of 330 degrees Fahrenheit for 1.5 hours in an aluminum mold. The board was tested in accordance with the general testing procedures above and the results are shown in Table 5.

EXAMPLE 23

A simulated mixture of a partly defatted corn germ was prepared by extracting protein and fat and mixing it to arrive at 100 parts sawdust, 50 parts of the defatted corn germ, 50 parts of water, 10 parts of the oxirane and 20.0 parts of oil. A board was made and cured at a temperature of 330 degrees Fahrenheit for 1.5 hours in an aluminum mold. The board was tested in accordance with the general testing procedures above and the results are shown in Table 5.

TABLE 5

Plasticizing Effect of Oil in Oxirane Cured Corn Germ Composite

| Sawdust lb | Defatted lb | Water lb | Oxirane lb | Oil lb | Elastic MOD (PSI) | Rupture MOD (PSI) | Specific Gravity | % Thickness Change |
|---|---|---|---|---|---|---|---|---|
| 100 | 50 | 50 | 10 | 0.0 | 199,451 | 2,375 | 0.77 | 12.0 |
| 100 | 50 | 50 | 10 | 9.6 | 151,906 | 1,646 | 0.77 | 12.9 |
| 100 | 50 | 50 | 10 | 20.0 | 139,183 | 1,485 | 0.77 | 9.5 |
| 100 | 50 | 50 | 10 | 40.0 | 97,429 | 916 | 0.77 | 9.5 |

EXAMPLE 24

A simulated mixture of a partly defatted corn germ was prepared by extracting protein and fat and mixing it to arrive at 100 parts sawdust, 50 parts of the defatted corn germ, 50 parts of water, 10 parts of the oxirane and 40.0 parts of oil. A board was made and cured at a temperature of 330 degrees Fahrenheit for 1.5 hours in an aluminum mold. The board was made and tested and the results are shown in Table 5.

EXAMPLE 25

The optimized content was 15 parts of Epon 812 resin added to 50 parts of defatted corn germ. The board was cured at 160 degrees Celsius for 5 hours in an oven. All samples were made to achieve equal specific gravities. The highest moduli of elasticity and rupture were recorded. These data are shown in Table 6 and plotted on FIG. 4 showing the maximum moduli at 15 parts of E812. This optimal point can be related to the chemical stoichiometry of oxirane and protein during the resin curing.

EXAMPLE 26

To 100 parts of sawdust, 50 parts of defatted corn germ, and 50 parts of water, 15 parts of Epon 812 were added. All coupons were cured at 160 decrees Celsius for a period of time. Hours tried were 3, 4, 5, 6 and 7 hours. Table 7 shows the test data. The optimal curing time is 5 hours for 15 parts of oxirane.

TABLE 6

Effect of Increasing Oxirane on Modulus

| Sawdust lb | Water lb | Defatted Corn lb | Oxirane lb | MOE psi | MOR psi |
|---|---|---|---|---|---|
| 100 | 50 | 50 | 0 | 147,000 | 1640 |
| 100 | 50 | 50 | 5 | 229,000 | 2340 |
| 100 | 50 | 50 | 10 | 252,000 | 2770 |

TABLE 6-continued
Effect of Increasing Oxirane on Modulus

| Sawdust lb | Water lb | Defatted Corn lb | Oxirane lb | MOE psi | MOR psi |
|---|---|---|---|---|---|
| 100 | 50 | 50 | 15 | 282,000 | 2970 |
| 100 | 50 | 50 | 20 | 254,000 | 2670 |
| 100 | 50 | 50 | 25 | 233,000 | 2360 |
| 100 | 50 | 50 | 30 | 190,000 | 2180 |
| 100 | 50 | 50 | 40 | 125,000 | 1560 |

TABLE 7
Effect of Curing Time on Mechanical Properties

| Sawdust lb | Water lb | Defatted Corn lb | Time hr | MOE psi | MOR psi |
|---|---|---|---|---|---|
| 100 | 50 | 50 | 3 | 145,000 | 2340 |
| 100 | 50 | 50 | 4 | 194,000 | 2770 |
| 100 | 50 | 50 | 5 | 282,000 | 2970 |
| 100 | 50 | 50 | 6 | 195,000 | 2650 |
| 100 | 50 | 50 | 7 | 161,000 | 2220 |

TABLE 8
Effect of Cure Temperature and Time on Modulus

| Cure Temperature C. | Cure Time hr | MOE psi | MOR psi |
|---|---|---|---|
| 140 | 5 | 127,000 | 2020 |
| 140 | 6 | 148,000 | 2100 |
| 140 | 7 | 153,000 | 2060 |
| 150 | 4 | 187,000 | 2490 |
| 150 | 5 | 181,000 | 2810 |
| 150 | 6 | 156,000 | 2220 |
| 150 | 7 | 130,000 | 1780 |
| 160 | 3 | 145,000 | 2340 |
| 160 | 4 | 194,000 | 2770 |
| 160 | 5 | 282,000 | 2970 |
| 160 | 6 | 195,000 | 2650 |
| 160 | 7 | 161,000 | 2220 |
| 170 | 3 | 178,000 | 2570 |
| 170 | 4 | 195,000 | 2340 |
| 170 | 5 | 192,000 | 2220 |
| 170 | 6 | 156,000 | 1820 |
| 180 | 3 | 187,000 | 2340 |
| 180 | 4 | 191,000 | 2410 |
| 180 | 5 | 182,000 | 1900 |
| 180 | 6 | 154,000 | 1820 |

EXAMPLE 27

Using 100 parts of sawdust, 50 parts of defatted corn, 50 parts of water, and 15 parts of oxirane, various cure temperatures and cure time were scanned to try to make a quality board. Data of Table 8 and the graphs of FIGS. 6 and 7 show the effect of cure time and temperature on mechanical moduli. The topimal point was observed at 160 degrees Celsius and for 5 hours. At 140 degrees Celsius, more than 5 hours is needed to compete with commercial boards. At a temperature of 150 degrees Celsius, the cure time of 5 hours yielded the maximum observed moduli. At 170 degrees Celsius, a cure time between 3 and 4 hours is recommended, whereas for a cure temperature of 180 degrees Celsius, 4 hours is favorable.

EXAMPLE 28

Various amounts of water were added to 100 parts of sawdust, 50 parts of defatted corn germ, and 15 parts of oxirane. The amounts of water formulated were 30, 40, 50, 60 and 70 parts. Data of Table 9 and FIG. 8 present a trend and show that the highest modulus were achieved with a water content of 50 parts. More or less water content will both lower the moduli of rupture and elasticity.

EXAMPLE 29

Keeping temperature constant at 160 degrees Celsius and cure time for 5 hours, protein source, i.e. defatted corn germ, was varied from 30 to 70 parts in the mixture of 100 parts of sawdust and 50 parts of water. The results of the analysis are shown in Table 10. Fifty parts of defatted corn germ is the best. This analysis demonstrates that a polymerization reaction may be initiated between the cellulos fiber source and the glutamic acid, forming an ester.

TABLE 9
Effect of Increasing Oxirane on Modulus

| Sawdust lb | Water lb | Defatted Corn lb | Oxirane lb | MOE psi | MOR psi |
|---|---|---|---|---|---|
| 100 | 30 | 50 | 15 | 164,000 | 2070 |
| 100 | 40 | 50 | 15 | 224,000 | 2710 |
| 100 | 50 | 50 | 15 | 282,000 | 2970 |
| 100 | 60 | 50 | 15 | 256,000 | 3040 |
| 100 | 70 | 50 | 15 | 245,000 | 2680 |

EXAMPLE 30

Various quantities of oxirane were added to 100 parts of sawdust, 50 parts of water, and 50 parts of oil-containing corn germ. The quantities of oxirane tried were 10, 15, 20 and 30 parts. Test specimens were cured at 160 degrees Celsius for 5 hours. Table 11 presented the results of the test. Oil acts as a resin plasticizer. It weakens the elastic strength, resulting in a modulus of elasticity of the order of 90,000–200,000 psi, significantly smaller than that of oil extracted corn germ board. And yet it still is competitive with the commercial board.

TABLE 10
Effect of Increasing Oxirane on Modulus

| Sawdust lb | Water lb | Defatted Corn lb | Oxirane lb | MOE psi | MOR psi |
|---|---|---|---|---|---|
| 100 | 50 | 30 | 0 | 110,000 | 1450 |
| 100 | 50 | 40 | 0 | 120,000 | 1540 |
| 100 | 50 | 50 | 0 | 147,000 | 1640 |
| 100 | 50 | 60 | 0 | 136,000 | 1420 |
| 100 | 50 | 70 | 0 | 93,000 | 1000 |

TABLE 11
Effect of Increasing Oxirane on Modulus for Oil-included Corn Germ Board

| Sawdust lb | Water lb | Oil Corn Germ lb | Oxirane lb | MOE psi | MOR psi |
|---|---|---|---|---|---|
| 100 | 50 | 50 | 10 | 174,000 | 2210 |
| 100 | 50 | 50 | 15 | 202,000 | 2970 |
| 100 | 50 | 50 | 20 | 128,000 | 1730 |
| 100 | 50 | 50 | 30 | 99,300 | 1660 |

EXAMPLE 31

The initiators studied in the research included hydrogen peroxide—ferrous ion, peroxosulfate ion, and peroxosulfate—thiosulfate systems. Table 12 compares the effects of two other initiator systems, using a two-stage curing process where stage one was at 80 degrees Celsius for 1, 2, 3 or 4 hours, and stage two at 160 C. for 4 hours. The formulation was 100 parts of sawdust, 100 parts of milo stillage, 15 parts of oxirane, and 10 parts of initiator. The results seem that the performance of peroxosulfate thiosulfate system is far better than that of peroxosulfate. Therefore, peroxosulfate and thiosulfate were the determined redox system in the experiment.

TABLE 12

Effect of Different Initiators on Modulus of Milo Stillage Board

| Temp 1 C. | Time 1 hr | Temp 2 C. | Time 2 hr | MOE psi | MOR psi |
|---|---|---|---|---|---|
| 80 | 1 | 160 | 4 | 147,000 | 956 |
| 80 | 2 | 160 | 4 | 144,000 | 1050 |
| 80 | 3 | 160 | 4 | 137,000 | 941 |
| 80 | 4 | 160 | 4 | 139,000 | 979 |
| 80 | 1 | 160 | 4 | 111,000 | 880 |
| 80 | 2 | 160 | 4 | 113,000 | 866 |
| 80 | 3 | 160 | 4 | 112,000 | 791 |
| 80 | 4 | 160 | 4 | 109,000 | 791 |

In the meantime, the different cure time for the oil polymerization was considered. A two-stage curing process was suggested, one for oil polymerization curing, the other for the original curing process. The temperature used in the stageone cure was chosen based on the theoretical chaingrowth cure temperature range. The following temperatures 80, 100 and 120 degrees Celsius were used, At each temperature, the following cure times 1, 2, 3 and 4 hours were used. The formulation was not changed. The curing condition in stage two was still 160 degrees Celsius and 4 hours. The results, see Table 13, show that the optimal point for stage-one curing is at 80 degrees Celsius and for between 1 and 2 hours.

EXAMPLE 32

A board was made of 100 parts of sawdust, 50 parts of defatted germ and 50 parts of water and is presented by the data of Table 14.

Hours studied were 3, 4, 5, 6 and 7 hours, Specimens were cured at 165 degrees Celsius with 15 parts of Epon 812. Table 14 reports the modulus of elasticity and rupture achieved. The optimized cure time is 5 hours for 15 parts of Epon 812. Data does show a correlation between formulation and modulus. The specimen and mold were heated in an electrical oven .

TABLE 13

Effect of Cure Time and Temperature at Stage One of Milo Stillage Board

| Temp 1 C. | Time 1 hr | Temp 2 C. | Time 2 hr | MOE psi | MOR psi |
|---|---|---|---|---|---|
| 80 ... See Table 12 | | | | | |
| 100 | 1 | 160 | 4 | 144,000 | 979 |
| 100 | 2 | 160 | 4 | 131,000 | 904 |
| 100 | 3 | 160 | 4 | 137,000 | 941 |
| 100 | 4 | 160 | 4 | 137,000 | 753 |
| 120 | 1 | 160 | 4 | 91,300 | 758 |
| 120 | 2 | 160 | 4 | 113,000 | 858 |
| 120 | 3 | 160 | 4 | 110,000 | 672 |
| 120 | 4 | 160 | 4 | 101,000 | 747 |

TABLE 14

Effect of Increasing Cure Time on Modulus, Defatted Corn Germ

| Sawdust lb | Water lb | Defattd Corn Germ lb | Time Hour | Elasticity MOD (PSI) | Rupture MOD (PSI) |
|---|---|---|---|---|---|
| 100 | 50 | 50 | 3 | 145,321 | 2,335 |
| 100 | 50 | 50 | 4 | 193,761 | 2,771 |
| 100 | 50 | 50 | 5 | 281,755 | 2,969 |
| 100 | 50 | 50 | 6 | 195,389 | 2,969 |
| 100 | 50 | 50 | 7 | 160,891 | 2,216 |

EXAMPLE 33

Various quantities of water were added to 100 parts of fiber, 50 parts of defatted corn germ and 15 parts of Epon 812 prior to the cure study the effect of this variable. The amount of water formulated as 30, 40, 50, 60 and 70 parts. Data of Table 15 provides a trend and show that the highest modulus of elasticity was achieved with a water content of 50 parts. If more or less than 50 parts of water were added, the modulus of elasticity and rupture became lower.

EXAMPLE 34

Data of Table 16 shows the results of cure time and temperature on mechanical properties. The formulation were for 100 parts of oxirane, 50 parts of defatted corn germ and 50 parts of water. The maximum observed moduli of elasticity and rupture were obtained at a temperature of 165 degrees Celsius when the cure time was 5 hours. At the cure temperature of 180 degrees Celsius, cure time of 4 hours yielded observed maximum. At a temperature 170 degrees Celsus, a cure time between 3 and 4 hours is recommended, whereas for a cure temperature of 150 degrees Celsius, a cure time of 4 and 5 hours are favorable. Reaction rates are expected to be temperature dependent. At 140 degrees Celsius, more than 5 hours is required to complete the temperature dependent reactions. However, the data demonstrate that the optimization condition is 165 degrees Celsius for 5 hours. Alternate energy sources can potentially cure this resin system in a short time. For example, 180 degrees Celsius for 3 hours provides this occasion. Energy transfer is a limiting constraint in an electricity heater, convection oven.

TABLE 15

Effect of Increasing Water on Modulus, Defatted Corn Germ

| Sawdust lb | Water lb | Oil Extracted Corn Germ lb | Oxirane (E812) lb | Elasticity MOD (PSI) | Rupture MOD (PSI) |
|---|---|---|---|---|---|
| 100 | 30 | 50 | 15 | 164,282 | 2,065 |
| 100 | 40 | 50 | 15 | 224,067 | 2,706 |
| 100 | 50 | 50 | 15 | 281,755 | 2,969 |
| 100 | 60 | 50 | 15 | 256,277 | 3,043 |
| 100 | 70 | 50 | 15 | 245,181 | 2,683 |

TABLE 16

Effect of Cure Temperature and Time on Modulus, Defatted Corn Germ

| Cure Temperature C. | Cure Time Hr | Elasticity MOD (PSI) | Rupture MOD (PSI) |
|---|---|---|---|
| 180 | 3 | 186,841 | 2,335 |
| 180 | 4 | 191,354 | 2,414 |
| 180 | 5 | 182,050 | 1,900 |
| 180 | 6 | 153,719 | 1,821 |
| 170 | 3 | 177,944 | 2,573 |
| 170 | 4 | 194,826 | 2,335 |
| 170 | 5 | 191,632 | 2,216 |
| 170 | 6 | 156,015 | 1,821 |
| 165 | 3 | 145,321 | 2,335 |
| 165 | 4 | 193,761 | 2,771 |
| 165 | 5 | 281,755 | 2,969 |
| 165 | 6 | 195,389 | 2,652 |
| 165 | 7 | 160,891 | 2,216 |
| 150 | 4 | 186,841 | 2,494 |
| 150 | 5 | 180,523 | 2,810 |
| 150 | 6 | 155,701 | 2,261 |
| 150 | 7 | 129,751 | 1,781 |
| 140 | 5 | 127,003 | 2,019 |
| 140 | 6 | 148,287 | 2,098 |
| 140 | 7 | 152,969 | 2,058 |

EXAMPLE 35

Thirty-three parts of corn stillage were mixed with 100 parts of sawdust and 6 parts of oxirane (Ciba-Geigy (9138)) obtainable from Ciba-Geigy Corporation. The stillage had water within it. The boards had a specific gravity of 0.72 and were cured at a pressure of 200 PSI, a temperature of 325 degrees Fahrenheit for 45 minutes. Three samples were tested and they showed for the first sample a modulus of rupture of 1457 PSI and a modulus of elasticity of 886, 788 PSI; for the second sample, a modulus of rupture of 518 PSI and a modulus of elasticity of 302,741 PSI; and for the third sample, a modulus of rupture of 1128 and a modulus of elasticity of 601,646. The level of deviation from sample to sample is probably related to inconsistency in mixing of filler and binder.

EXAMPLE 36

Thirty-three parts of corn stillage were mixed with 100 parts of sawdust and 6 parts of oxirane (Epon (828)). The stillage had water within it. The boards had a specific gravity of 0.7215 and were cured at a pressure of 200 PSI, a temperature of 325 degrees Fahrenheit for 45 minutes. Three samples were tested and they showed for the first sample a modulus of rupture of 1000 PSI and a modulus of elasticity of 678,792 PSI; for the second sample, a modulus of rupture of 410 PSI and a modulus of elasticity of 680,577 PSI; and for the third sample, a modulus of rupture of 796 and a modulus of elasticity of 463,550.

EXAMPLE 37

Thirty-three parts of corn stillage were mixed with 100 parts of wood chips and 4 parts of oxirane (Epon (828)). The stillage had water within it. The boards had a specific gravity of 0.7215 and were cured at a pressure of 200 PSI, a temperature of 325 degrees Fahrenheit for 45 minutes. Three samples were tested and they showed for the first sample a modulus of rupture of 1032 PSI and a modulus of elasticity of 550,080 PSI; for the second sample, a modulus of rupture of 430 PSI and a modulus of elasticity of 225,205 PSI; and for the third sample, a modulus of rupture of 713 and a modulus of elasticity of 393,182.

EXAMPLE 38

Thirty-three parts of corn stillage were mixed with 100 parts of wood chips, 2 parts of oxirane (Epon (828)). The stillage had water within it. The boards had a specific gravity of 0.7215 and were cured at a pressure of 200 PSI, a temperature of 325 degrees Fahrenheit for 45 minutes. Three samples were tested and they showed for the first sample a modulus of rupture of 345 PSI and a modulus of elasticity of 183,542 PSI; for the second sample, a modulus of rupture of 313 PSI and a modulus of elasticity of 139,355 PSI; and for the third sample, a modulus of rupture of 594 and a modulus of elasticity of 257,735.

EXAMPLE 39

Thirty-three parts of corn stillage were mixed with 100 parts wood chips. The stillage had water within it. The boards had a specific gravity of 0.7022 and were cured at a pressure of 200 PSI, a temperature of 325 degrees Fahrenheit for 45 minutes. Three samples were tested and they showed for the first sample a modulus of rupture of 787 PSI and a modulus of elasticity of 483,853 PSI; for the second sample, a modulus of rupture of 525 PSI and a modulus of elasticity of 318,664 PSI; and for the third sample, a modulus of rupture of 330 and a modulus of elasticity of 192,778.

EXAMPLE 40

Thirty-three parts of milo stillage were mixed with 100 parts of wood chips and 4 parts of oxirane (Epon (828)). The stillage had water within it. The boards had a specific gravity of 0.73 and were cured at a pressure of 200 PSI, a temperature of 325 degrees Fahrenheit for 45 minutes. Three samples were tested and they showed for the first sample a modulus of rupture of 592 PSI and a modulus of elasticity of 306,508 PSI; for the second sample, a modulus of rupture of 610 PSI and a modulus of elasticity of 339,853 PSI; and for the third sample, a modulus of rupture of 296 and a modulus of elasticity of 172,325.

EXAMPLE 41

Thirty-three parts of milo stillage were mixed with 100 parts of wood chips, 8 parts of oxirane (Ciba-Geigy (9138)) obtainable from Ciba-Geigy Corporation. The stillage had water within it. The boards had a specific gravity of 0.73 and were cured at a pressure of 200 PSI, a temperature of 325 degrees Fahrenheit for 45 minutes. Three samples were tested and they showed for the first sample a modulus of rupture of 727 PSI and a modulus of elasticity of 414,257 PSI; for the second sample, a modulus of rupture of 690 PSI and a modulus of elasticity of 391,991 PSI; and for the third sample, a modulus of rupture of 968 and a modulus of elasticity of 446,867.

EXAMPLE 42

Thirty-three parts of milo stillage mash were mixed with 100 parts of wood chips, 8 parts of oxirane (Ciba-Geigy (9138)) obtainable from Ciba-Geigy Corporation. The stillage had water within it. The boards had a specific gravity of 0.715 and were cured at a pressure of 200 PSI, a temperature of 325 degrees Fahrenheit for 45 minutes. Three samples were tested and they showed for the first sample a modulus of rupture of 1034 PSI and a modulus of elasticity of 539,984 PSI; for the second sample, a modulus of rupture of 869 PSI and a modulus of elasticity of 476,859 PSI; and for the third sample, a modulus of rupture of 645 and a modulus of elasticity of 201,008.

EXAMPLE 43

The effect of the thick corn stillage was studied here. The quantity of oxirane blended with 100 parts of corn stillage and 100 parts of sawdust, were 0, 5, 10 and 15 parts. The new stillage and old stillage, of which the distinction was the length of the storage period, were both selected as protein sources. In this case, the so-called old stillage was about three months older than the new stillage. The results of the study described in Table 17 reveal that the length of the period of time in storage does affect the mechanical properties as the function of protein in stillage may depend upon the extent of protein damage during storage period when mold is growing gradually. New stillage performs better than the old.

TABLE 17

Effect of Increasing Oxirane on Modulus of Corn Stillage Board

| Sawdust lb | Corn Stillage lb | Oxirane lb | MOE psi | MOR psi |
|---|---|---|---|---|
| Old | | | | |
| 100 | 100 | 0 | 82,300 | 562 |
| 100 | 100 | 10 | 90,900 | 738 |
| 100 | 100 | 15 | 78,200 | 646 |
| New | | | | |
| 100 | 100 | 5 | 129,000 | 944 |
| 100 | 100 | 10 | 123,000 | 966 |

EXAMPLE 44

The change into milo stillage as a protein source does not change the fact of bad mechanical performance with stillage although its properties do contain an optimal point. Various amounts of oxirane were added to 100 parts of sawdust and 100 parts of wet milo stillage. The parts tried were 0, 5, 10, 15, 20, 25, 30 and 40 parts. Table 18 provides a trend and show that 10 parts of oxirane was the best.

EXAMPLE 45

In the following procedure, 10 parts of oxirane was always used to find the optimal combination of cure temperature and time. The formulation contained 100 parts of milo, 100 parts of sawdust and oxirane. Cure temperature was varied from 150 degrees Celsius to 190 degrees Celsius using a 10 degree Celsius increment. At a constant temperature, various periods of cure time were scanned to find the optimal condition. The results are recorded in Table 19, which shows the optimal points were between 6 and 7 hours at 150 degrees Celsius, 5 hours at 160 degrees Celsius, 4 hours at 170 degrees Celsius, 3 to 4 hours at 180 degrees Celsius, and 2 hours at 190 degrees Celsius. Among them, 5 hours at 160 Celsius exhibits the most suitable cure condition by consideration of mechanical quality and economical factors.

TABLE 18

Effect of Increasing Oxirane on Modulus of Milo Stillage Board

| Sawdust lb | Milo Stillage lb | Oxirane lb | MOE psi | MOR psi |
|---|---|---|---|---|
| 100 | 100 | 0 | 106,000 | 738 |
| 100 | 100 | 5 | 108,000 | 755 |
| 100 | 100 | 10 | 113,000 | 775 |
| 100 | 100 | 15 | 97,500 | 702 |
| 100 | 100 | 20 | 71,300 | 591 |
| 100 | 100 | 25 | 61,100 | 509 |
| 100 | 100 | 30 | 57,000 | 436 |
| 100 | 100 | 40 | 42,600 | 369 |

EXAMPLE 46

When protein is subjected to extremes in temperature and pH, it is denatured. An example is the boiling of an egg. To demonstrate this, defatted corn germ was preheated at 160 degrees Celsius for various periods of time. The periods of time preheated includes 0.5, 1, 1.5 and 2 hours. The formulation was 100 parts of sawdust, 50 parts of preheated corn germ, 50 parts of water and 15 parts of oxirane. All specimens were cured at 160 decrees Celsius for 5 hours. The results provided by Table 20 demonstrate that the shorter time the defatted germ was preheated, the higher the modulus was.

TABLE 19

Effect of Cure Temperature and Time on Modulus of Milo Stillage Board

| Cure Temperature °C. | Cure Time hr | MOE psi | MOR psi |
|---|---|---|---|
| 150 | 4 | 88,100 | 702 |
| 150 | 5 | 98,200 | 738 |
| 150 | 6 | 109,000 | 738 |
| 150 | 7 | 100,000 | 775 |
| 160 | 3 | 91,700 | 665 |
| 160 | 4 | 91,100 | 738 |
| 160 | 5 | 113,000 | 775 |
| 160 | 6 | 105,000 | 775 |
| 160 | 7 | 89,500 | 702 |
| 160 | 8 | 75,100 | 591 |
| 170 | 4 | 113,000 | 775 |
| 170 | 5 | 110,000 | 775 |
| 170 | 6 | 106,000 | 702 |
| 180 | 2 | 89,600 | 747 |
| 180 | 3 | 103,000 | 775 |
| 180 | 4 | 100,000 | 836 |
| 190 | 2 | 90,400 | 747 |
| 190 | 3 | 90,400 | 672 |

TABLE 20

Effect of Corn Germ's Heating Time on Modulus

| Defatted Corn lb | Heating Time hr | Oxirane lb | MOE psi | MOR psi |
|---|---|---|---|---|
| 50 | 0.5 | 15 | 182,000 | 2320 |
| 50 | 1.0 | 15 | 201,000 | 2020 |
| 50 | 1.5 | 15 | 135,000 | 1600 |
| 50 | 2.0 | 15 | 130,000 | 1590 |

Then the alcohol manufacturing process was simulated. The formulations were the same as before while the precooked conditions were changed. One analysis was developed with defatted corn germ under the simulated precooking condition to see the effect of oxirane on the mechanical properties. Various amounts of oxirane were added to 100 parts of sawdust, 50 parts of water, and 50 parts of defatted corn germ, which was preheated twice each at 160 degrees Celsius for one hour. The parts of oxirane studied were 10, 15, 20 and 30 parts. The other analysis was given under the similar conditions. The difference was that the pH value in the duration of preheating was pH 6 under the first preheating period, and pH 4 under the second preheating period. The results of both analysis presented by Table 21 show that preheating and acid damage the proteins, and the mechanical properties of the board with acidified preheated proteins were bad and close to those of stillage agriboard. That also explains why it was hard to increase the moduli of the milo or corn stillage board.

TABLE 21

Effect of Increasing Oxirane on Modulus Under Simulated Alcohol Plan Condition

| Sawdust lb | Water lb | Defatted Corn lb | Oxirane lb | MOE psi | MOR psi |
|---|---|---|---|---|---|
| 100 | 50 | 50 | 10 | 141,000 | 1760 |
| 100 | 50 | 50 | 15 | 187,000 | 1930 |
| 100 | 50 | 50 | 20 | 128,000 | 1390 |
| 100 | 50 | 50 | 30 | 111,000 | 1300 |
| 100 | 50 | 50 | 10 | 93,700 | 1140 |
| 100 | 50 | 50 | 15 | 117,000 | 1220 |
| 100 | 50 | 50 | 20 | 115,000 | 1230 |
| 100 | 50 | 50 | 30 | 94,600 | 999 |

EXAMPLE 47

The raw materials of milo stillage is a mixture of glycerides. Such oils are classified as semidrying oils, due to the relatively low unsaturation levels, which is a negative factor for a quality binder. The oil acts as a plasticizer and unstable. A significant amount of unsaturation provided by the double bond is needed for free radical polymerization. Since the chemical structure is nearly saturated, an effective initiator should be found for the polymerization of the glycerides. Furthermore, impurities created by other materials occurring in the composite may inhibit the polymerization. Because the oils will act as plasticizers, their chemical incorporation into the polymer chain is mandatory.

The initiators studied in this research include Potassium peroxodisulfate ($K_2S_2O_8$), Potassium thiosulfate ($K_2S_2O_3$, 1.3 $H_2O$), Hydrogen peroxide ($H_2O^2$), and Ferrous sulfate ($FeSO^4$). Potassium peroxodisulfate and Potassium thiosulfate system were chosen as two main initiators to be examined. The hydrogen peroxide-ferrous sulfate system was not chosen in this study because it could darken the color and weaken the elastic, rupture modulus of the particle board. One hundred parts of fiber, 15 parts of oxirane (Epon 812), 100 parts of wet thin milo stillage (50 percent of solids content), and 10 parts of initiator was added. Table 22 compares the effect of two other initiator systems, using a two-stage curing process where stage one was 80 degrees Celsius for 1, 2, 3 and 4 hours, and stage two at 165 degrees Celsius for 4 hours. The results show that the performance of peroxsulfate-thiosulfate system is better than that of peroxosulfate. Therefore, peroxosulfate and thiosulfate were the ones chosed in this research. Also using the same formulation, the cure temperature was changed in stage one. The cure temperatures tried in stage one were 80, 100 and 120 degrees Celsius. The two stage curing process stands for, one for oil polymerization curing and the other for the original curing process. Table 23 and FIG. 25 represent that the optimal condition for stage one curing is at 80 degrees Celsius and for between 1 and 2 hours.

TABLE 22

Comparison Effect of Different Initiators on Modulus, Milo Stillage

| Initiator | Temp 1 C. | Time 1 Hour | Temp 2 C. | Time 2 Hour | Elasticity MOD (PSI) | Rupture MOD (PSI) |
|---|---|---|---|---|---|---|
| $K^2S^2O^8$ | 80 | 1 | 165 | 4 | 113,013 | 880 |
| $K^2S^2O^8$ | 80 | 2 | 165 | 4 | 113,413 | 866 |
| $K^2S^2O^8$ | 80 | 3 | 165 | 4 | 111,886 | 791 |
| $K^2S^2O^8$ | 80 | 4 | 165 | 4 | 109,362 | 791 |
| $K^2S^2O^8$-$K^2S^2O^3$ | 80 | 1 | 165 | 4 | 146,928 | 956 |
| $K^2S^2O^8$-$K^2S^2O^3$ | 80 | 2 | 165 | 4 | 143,538 | 1,054 |
| $K^2S^2O^8$-$K^2S^2O^3$ | 80 | 3 | 165 | 4 | 136,703 | 941 |
| $K^2S^2O^8$-$K^2S^2O^3$ | 80 | 4 | 165 | 4 | 139,118 | 979 |

Even though these optimum results are encouraging, the initiators cost effectiveness is very high. The redox system is not suitable for an application to commercial board production at this time. However, if low-priced initiators can be found for the polymerization of the glyceride in future research. It will be suitable for an application to the commercial board production.

EXAMPLE 48

Various quantities of epoxide resix were added to 100 parts of fiber, 50 parts of dry thin milo stillage and 50 parts of water, The amounts tried were 5, 10, 15, 20, 25, 30, 35 and 40 parts (see Table 23). All samples were made to achieve equal specific gravities and were cured at 165 degrees Celsius for 5 hours. Table 23 provides an interesting trend. The optimized content was 25 parts of epoxy resin (E812) to 50 parts of dry thin milo stillage. At this epoxide concentration, the highest elastic and rupture moduli were recorded.

TABLE 23

Effect of Increasing Oxirane on Modulus Using Dry, Thin Milo Stillage

| Sawdust lb | Water lb | Oil Included Milo Stillage lb | Oxirane (E812) lb | Elasticity MOD (PSI) | Rupture MOD (PSI) |
|---|---|---|---|---|---|
| 100 | 50 | 50 | 5 | 89,278 | 718 |
| 100 | 50 | 50 | 10 | 110,738 | 906 |
| 100 | 50 | 50 | 15 | 121,788 | 947 |
| 100 | 50 | 50 | 20 | 125,715 | 1,001 |
| 100 | 50 | 50 | 25 | 129,645 | 1,003 |
| 100 | 50 | 50 | 30 | 112,773 | 874 |
| 100 | 50 | 50 | 35 | 102,391 | 874 |
| 100 | 50 | 50 | 40 | 77,064 | 758 |

Additional epoxy after optimum concentration seemed to cause degradation due to an imbalance in the stoichiometric ratio between oxirane and polypeptides. The data shows the maximum at 25 parts of oxirane. Inasmuch as the resin cures utilizes oxirane and protein, this optimal point likely relates to chemical stoichiometry, which in turn maximizes crosslink extent and miniminizes plasticizing effects of excess reactants that occur at higher and lower levels of oxirane content.

Data of Table 23 indicate a quality resin with a modulus of elasticity of 129,645 psi and the moduli of rupture of 1,030 psi respectively, with 25 parts oxirane. The board was not as good as commercial product. The performances of modulus are 10.6 percent and 52.7 percent lower respectively. If the oil is not polymerized, it acts as a resin plasticizer.

From the above cases, the best moduli of elastic results are presented by corn germ-oil extracted. The defatted corn germ, corn stillage modulus results are better than oil included corn germ, corn stillage. The oil included corn germ, corn stillage, and milo stillage are not recommended as comparison to commercial board. Future research should include a protein analysis to see if increased stillage content, perhaps at reduced fiber content, will improve product performance.

EXAMPLE 49

Three different epoxide resins were used in the cures, including Epon 828, Epon 812 and aliphatic oxirane RD2 and various quantities of epoxide resin were added to 100 parts of fiber, 50 parts of oil including corn stillage and 50 parts of water. The amounts tried were 5, 10, 15 and 20 parts (see Table 24). All samples were made to achieve equal specific gravities and cured at 165 degrees Celsius for 5 hours. The best modulus of elasticity result is presented by E812 (10, 15 and 20 parts). Since the aliphatic Epon 812 and RD2 are less viscous, they are easier to blend and spread over the cellulose fiber particle. In addition to this, both of them have smaller weight-functionality ratio than Epon 828 does. The modulus of elasticity and rupture result are presented by Table 24.

TABLE 24

Comparison Effect of Different Oxirane on Modulus Using Dry, Thin Corn Stillage

| Oxirane lb | Sawdust lb | Water lb | Oil Included Milo Stillage lb | Elasticity MOD (PSI) | Rupture MOD (PSI) |
|---|---|---|---|---|---|
| E828(5)  | 100 | 50 | 50 | 42,070  | 441 |
| E812(5)  | 100 | 50 | 50 | 57,131  | 524 |
| RD2(5)   | 100 | 50 | 50 | 82,611  | 647 |
| E828(10) | 100 | 50 | 50 | 32,433  | 366 |
| E812(10) | 100 | 50 | 50 | 106,589 | 905 |
| RD2(10)  | 100 | 50 | 50 | 80,563  | 678 |
| E828(15) | 100 | 50 | 50 | 52,587  | 481 |
| E812(15) | 100 | 50 | 50 | 111,012 | 870 |
| RD(15)   | 100 | 50 | 50 | 105,515 | 890 |
| E828(20) | 100 | 50 | 50 | 47,190  | 452 |
| E812(20) | 100 | 50 | 50 | 113,130 | 855 |
| RD2(20)  | 100 | 50 | 50 | 82,214  | 948 |

EXAMPLES 50

Two different epoxide resins were used in the cures, including Epon 828, Epon 812 and various quantities of epoxide resin were added to 100 parts of fiber, 50 parts of oil extracted corn stillage and 50 parts of water. The amount tried were 5, 10, 15 and 20 parts (see Table 25). All samples were made to achieve equal specific gravities and cured at 165 degrees Celsius for 5 hours. The better modulus of elasticity and rupture are presented by E812 (5, 10, 15 and 20 parts) than with E828. The modulus of elasticity and rupture result are presented by Table 25.

EXAMPLE 51

Three different epoxided resin were used in the cures, including Epon 828, Epon 812, RD2 and same quantities of epoxide resin (20 parts) were added to 100 parts of fiber, 50 parts of oil extracted milo stillage and 50 parts of water (see Table 26). All samples were made to achieve equal specific gravities and cured at 165 degrees Celsius for 5 hours. We found that the best modulus of elasticity and rupture is presented by E812 20 parts. The modulus of elasticity and rupture results are presented by Table 26.

From the above three cases, Epon 812 produced a product with the best modulus of elastic and rupture among the different oxiranes.

TABLE 25

Comparison Effect of Different Oxirane on Modulus Using Dry, Thin Defatted Corn Stillage

| Oxirane lb | Sawdust lb | Water lb | Oil Included Corn Stillage lb | Elasticity MOD (PSI) | Rupture MOD (PSI) |
|---|---|---|---|---|---|
| E828(5)  | 100 | 50 | 50 | 51,130  | 835 |
| E812(5)  | 100 | 50 | 50 | 69,151  | 825 |
| E828(10) | 100 | 50 | 50 | 61,980  | 480 |
| E812(10) | 100 | 50 | 50 | 145,410 | 1,335 |
| E828(15) | 100 | 50 | 50 | 90,340  | 640 |
| E812(15) | 100 | 50 | 50 | 162,690 | 1,640 |
| E828(20) | 100 | 50 | 50 | 86,125  | 565 |
| E812(20) | 100 | 50 | 50 | 82,286  | 1,080 |

TABLE 26

Comparison Effect of Different Oxirane on Modulus Using Defatted Corn Germ

| Oxirane lb | Sawdust lb | Water lb | Oil Included Corn Stillage lb | Elasticity MOD (PSI) | Rupture MOD (PSI) |
|---|---|---|---|---|---|
| E828(10) | 100 | 50 | 50 | 138,630 | 1,687 |
| E812(10) | 100 | 50 | 50 | 252,260 | 2,774 |
| RD2(10)  | 100 | 50 | 50 | 158,172 | 1,939 |
| E828(15) | 100 | 50 | 50 | 174,720 | 1,960 |
| E812(15) | 100 | 50 | 50 | 281,755 | 2,969 |
| RD2(15)  | 100 | 50 | 50 | 177,944 | 2,256 |
| E828(20) | 100 | 50 | 50 | 151,037 | 1,784 |
| E812(20) | 100 | 50 | 50 | 254,362 | 2,667 |
| RD2(20)  | 100 | 50 | 50 | 159,693 | 2,137 |
| E828(30) | 100 | 50 | 50 | 158,463 | 1,634 |
| E812(30) | 100 | 50 | 50 | 190,187 | 2,175 |
| RD2(30)  | 100 | 50 | 50 | 108,204 | 1,504 |

EXAMPLE 52

Different quantities of epoxide resin (Epon 828) were added to 100 parts of fiber, 50 parts of oil included corn stillage and 50 parts of water. The amounts tried were 5, 10, 15, 20 and 25 parts (see Table 27). All samples were made to achieve equal specific gravities and were cured at 165 degrees Celsius for 5 hours. Data of Table 27 shows the optimized content was 15 parts of epoxy resin to 50 parts of oil included corn stillage.

At this epoxide concentration, the highest elasticity and rupture modulus were recorded. The experiment resulted in a composite with a modulus of elasticity of 52,587 psi and the moduli of rupture of 482 respectively, i.e., the board was not good. If this is compared with the defatted corn stillage, the performances of modulus are only 32.3 percent and 29.3 percent respectively. If the oil is not polymerized, it acts as a resin plasticizer. Data are graphed in FIG. 30.

EXAMPLE 53

Effect of increasing oxirane with an additional 50 parts of yeast are summarized by Table 28.

TABLE 27

Comparison Effect of Different Oxirane on Modulus Using Dry, Thin Defatted Milo Stillage

| Oxirane 20 lb | Sawdust lb | Water lb | Oil Included Milo Stillage lb | Elasticity MOD (PSI) | Rupture MOD (PSI) |
|---|---|---|---|---|---|
| E812 | 100 | 50 | 50 | 132,969 | 1,112 |
| E828 | 100 | 50 | 50 | 116,124 | 878 |
| RD2  | 100 | 50 | 50 | 100,462 | 892 |

TABLE 28

| Sawdust lb | Water lb | Oil Included Corn Stillage lb | Oxirane (E828) lb | Elasticity MOD (PSI) | Rupture MOD (PSI) |
|---|---|---|---|---|---|
| Effect of Increasing Epon 828 on Modulus, Corn Stillage | | | | | |
| 100 | 50 | 50 | 5  | 42,070 | 441 |
| 100 | 50 | 50 | 10 | 32,443 | 366 |
| 100 | 50 | 50 | 15 | 52,587 | 481 |
| 100 | 50 | 50 | 20 | 47,190 | 452 |
| 100 | 50 | 50 | 25 | 49,850 | 490 |
| Effect of Increasing Oxirane on Modulus, Dry Thin Corn Stillage, Plus 50 Parts Yeast | | | | | |
| 100 | 50 | 50 | 0  | 86,158  | 725 |
| 100 | 50 | 50 | 5  | 64,934  | 685 |
| 100 | 50 | 50 | 10 | 103,070 | 770 |
| 100 | 50 | 50 | 15 | 89,226  | 678 |
| 100 | 50 | 50 | 20 | 85,140  | 647 |

This additional protein is more improved than the performace of the composite of Example 52.

EXAMPLE 54

Boards having three final pressed board specific gravities were made. The specific gravities are 0.55, 0.65 and 0.82. These fall within the range of tha ANSI classifications for low, medium and high density particle boards. With these mixtures, the range of protein in the blend before pressing was 0.39 percent to 1.68 percent. The range of protein in the adhesive was 2.0 percent to 6.5 percent. Throughout the experiment, the wood chips used were aspen and each board was replicated twice.

Urea-Formaldehyde

In this experiment, urea-formaldehyde was used in place of the Epon 828. This reduced the price of the resin since Epon 828 costs $3.34 per kg and urea-formaldehyde only $0.02 per kg. The composition of the boards is shown in Table 31.

TABLE 31

| Composition as Percentage of Boards after Pressing | | | |
|---|---|---|---|
| Epon 828 | Syrup | Wood Chips | Water |
| 3.14 | 8.71 | 83.15 | 5.00 |
| 0.39 | 13.00 | 81.61 | 5.00 |
| 1.51 | 8.71 | 84.72 | 5.00 |

Additional boards were also made using only urea-formaldehyde. To keep the pressing times the same as with the previous boards, the moisture contents were held constant, even for the boards containing only urea-formaldehyde. This allowed a comparison to be made that was independent of process and additional additives. These boards were made at both the low and medium densities. Due to limitations with the press, no high density boards were made.

These boards were tested in the same manner as the previous boards to determine modulus of rupture, modulus of elasticity, shear strength, dimensional stability and water absorption. These boards were also produced in replicate. The mixtures used are given in Table 32.

To eliminate any variability that might arise from the wood chips, aspen chips were obtained from Potlatsch, Inc., Bemidigi, Minn. Aspen chips are the same chips that are used in commercial particle boards. By using these chips, the comparisons between our results and those for commercial particle boards could be made independent of the wood chips used.

TABLE 32

| Composition as Percentages of Boards after Pressing | | | |
|---|---|---|---|
| U-F | Syrup | Wood Chips | Water |
| 3.14 | 8.71 | 83.15 | 5.00 |
| 0.39 | 13.00 | 81.61 | 5.00 |
| 1.51 | 8.71 | 84.72 | 5.00 |
| 3.50 | 0.00 | 91.50 | 5.00 |

Plant Protein

The wet cake used in the preliminary studies was a by-product of alcohol distillation from yellow dent corn. It had a moisture content of 64 percent, contained 7.85 percent crude protein and 2.24 percent crude fiber. The syrup that was used for the final experiment was a protein-water suspension formed by the settling out, by centrifugation, the fiber in the wet cake. The moisture content of the syrup was 55 percent with 6.66 percent crude protein and 0.42 percent crude fiber.

Epon 828

Epon 828 is a low molecular weight epoxy resin manufactured by Shell Chemical Company. It is a pure liquid at room temperature and is light in color. Epon 828 is a liquid DGEBA resin which is a difunctional epoxy monomer. The epoxy equivalent weight of Epon 828 is between 185 and 192. Epoxy equivalent weight is defined as the weight of resin in grams which contains one gram equivalent of epoxy or oxirane. The viscosity of Epon 828 is between 10 and 16 Pa-s at 25 C [Lee and Neville, 1967]. An advantage of using Epon 828 instead of formaldehyde resins is that during cure no volatiles are given off [Park, 1985; Chen, 1985; Chang, 1984].

Urea-Formaldehyde

In a subset of the boards, urea-formaldehyde was substituted for Epon 828. The urea-formaldehyde used was a liquid resin, intended for use as a homogeneous particle board resin. The urea-formaldehyde resin was obtained from Borden Chemical, Division of Borden, Inc., Columbus, Ohio 43215.

PROCEDURES

The two major components of particle board are the adhesive and the adherend. In this experiment, the adhesive mixtures were made up and refrigerated overnight. The adhesive and the adherend were then mixed together and pressed on the following day.

The adhesive was mixed in small batches. These batches were sized to make one board. In preparing the adhesive, the syrup and water were first measured out and homogenized for 10 s. After this, the Epon 828 or urea-formaldehyde was added and the mixture was homogenized for another 20 s. The homogenizer used was a Polytron homogenizer distributed by Brinkmann Instruments. The container was then capped and placed in a refrigerator overnight.

The adhesive and the adherend were mixed on the following day. First, the proper amount of adherend was measured out and placed in a portable cement mixer. The mixer was then started and the adhesive was slowly poured on the adherend. After mixing for 4 minutes, the mixture was removed and placed in the mold. The mold was an angle iron frame 15 inches long, 8 inches wide and 2 inches deep. The press was preheated. This was done by starting the press 1 hour before press started. A trial board was then pressed to warm the mold up to press temperature. The mold and press then remained at 232 degrees Celsius throughout pressing. The boards were then pressed for 10 minutes, 11 minutes or 12 minutes depending upon whether the desired board density was high, medium or low, respectively. The boards were then removed from the press and allowed to cool.

After a sufficient time had passed so that the board's proprerties were not showing any affect due to the time of day of pressing, the boards were tested.

Epon 828

Low Density Board

Modulus of Rupture

From the data in Table 33, it is shown that the boards with the highest amounts of resin (Epon 828 plus syrup) had the highest modulus of rupture. The boards with the lowest amounts of resin were also shown to have the lowest modulus of rupture. Most interest is the 5.5 MPa modulus because 5.5 MPa is the ANSI minimum allowable modulus of rupture for a low density board (Table 33). SAS analysis of the data showed that both syrup and epoxy concentrations had significant affects (P 0.05) on the modulus of rupture with syrup concentration being more highly significant. Particle board can be made to meet minimum specifications without using Epon 828.

TABLE 33

| | Moduli of Rupture and Elasticity | | | |
|---|---|---|---|---|
| | Modulus of Rupture (MPa) | | Modulus of Elasticity (GPa) | |
| Point | Rep 1 | Rep 2 | Rep 1 | Rep 1 |
| 1 | 8.6 | 6.9 | 3.6 | 3.2 |
| 2 | 2.9 | 2.5 | 2.0 | 1.8 |
| 3 | 9.9 | 6.9 | 3.7 | 2.9 |
| 4 | 3.3 | 4.4 | 3.0 | 2.3 |
| 5 | 12.6 | 7.7 | 4.5 | 3.0 |
| 6 | 3.3 | 3.3 | 2.4 | 1.6 |
| 7 | 7.5 | 4.1 | 3.2 | 2.2 |
| 8 | 6.8 | 6.3 | 3.4 | 2.7 |
| 9 | 5.1 | 5.5 | 3.1 | 2.7 |
| 10 | 8.9 | 7.2 | 2.9 | 2.6 |

Modulus of Elasticity

From the data in Table 33, it is shown that all of the points within the ranges of Epon 828 and syrup concentrations used had higher moduli of elasticity than the ANSI Standard of 1.0 GPa. Using SAS, it was found that the concentration of syrup had a significant affect (P 0.05) on the modulus of elasticity while the epoxy concentration was not significant (P 0.05). Increasing the amount of syrup increased the modulus of elasticity. The modulus of elasticity increased with increasing epoxy concentrations at low syrup concentrations and with deceasing epoxy concentrations at high syrup concentration.

Shear Strength

The shear strength (internal bond) was found, by SAS, to be significantly affected (P 0.05) by syrup and epoxy concentrations. Since the sample was first tested in bending and then shear, if the bending test failed in shear, the shear test was affected. Table 34 includes the shear strength data. By increasing the syrup concentration the shear strength is increased. The shear strength is also increased by increasing the epoxy concentration at low syrup concentrations or by decreasing the epoxy concentration at high syrup concentrations.

TABLE 34

| | Linear Expanion and Shear Strength | | | |
|---|---|---|---|---|
| | Linear Expansion % | | Shear Strength (kPA) | |
| Point | Rep 1 | Rep 2 | Rep 1 | Rep 2 |
| 1 | 0.46 | 0.20 | 346 | 226 |
| 2 | 0.33 | 0.13 | N/A | N/A |
| 3 | 0.46 | 0.26 | 148 | 28 |
| 4 | 0.26 | 0.13 | N/A | N/A |
| 5 | 0.39 | 0.20 | 517 | 223 |
| 6 | 0.26 | 0.13 | N/A | N/A |
| 7 | 0.26 | 0.26 | 199 | 77 |
| 8 | 0.33 | 0.26 | 328 | 177 |
| 9 | 0.33 | 0.13 | 79 | 79 |
| 10 | 0.13 | 0.00 | 270 | 194 |

TABLE 35

| | Moduli of Rupture and Elasticity | | | |
|---|---|---|---|---|
| | Modulus of Rupture (MPa) | | Modulus of Elasticity (GPa) | |
| Point | Rep 1 | Rep 2 | Rep 1 | Rep 2 |
| 1 | 17.6 | 13.3 | 6.1 | 4.8 |
| 2 | 4.6 | 3.1 | 3.2 | 2.1 |
| 3 | 9.3 | 7.5 | 4.9 | 3.3 |
| 4 | 5.2 | 5.1 | 3.1 | 2.8 |
| 5 | 20.7 | 16.1 | 6.0 | 4.5 |
| 6 | 5.7 | 3.2 | 3.2 | 2.6 |
| 7 | 9.3 | 6.1 | 5.2 | 3.5 |
| 8 | 20.7 | 13.9 | 5.7 | 4.5 |
| 9 | 9.4 | 7.1 | 4.2 | 3.5 |
| 10 | 18.4 | 17.8 | 4.8 | 4.9 |

Medium Density Board

Modulus of Rupture

The data is given in Table 35 for the modulus of rupture. Of particular interest are the 11.0 MPa, 14.5 MPa and the 16.5 MPa values. These Values correspond to grades 1-M-1, 1-M-2 and 1-M-3. SAS analysis showed a significant affect (P 0.05) due to the syrup and epoxy concentration on the modulus of rupture. Like low density particle board medium density particle board could also be made that met standards without any epoxy. An increase in modulus of rupture is caused by an increase in syrup concentration.

Modulus of Elasticity

All of the boards within the syrup and epoxy contents ranges tested had a modulus of elasticity value greater than the ANSI standard (FIG. 36). Using SAS to analyze the data, the syrup concentration was again significant (P 0.05). While no significant affect (P 0.05) was found due to epoxy concentrations. FIG. 36 shows that increasing the syrup concentration at a constant epoxy concentration increased the modulus of elasticity more than an increase in epoxy concentration at a constant syrup concentration. At low syrup concentrations, the modulus of elasticity is increased by increasing the epoxy concentration. While at high syrup concentrations the modulus of elasticity is increased by decreasing the epoxy concentration. The modulus of elasticity data is given in Table 35.

Shear Strength

Table 36 includes the shear strength data for the medium density boards. SAS analysis showed that there was a significant affect (P 0.05) on shear strength due to epoxy concentration and no significant affect (P 0.05) due to the syrup concentration. An increase in the epoxy concentration increases the shear strength. The shear strength is increased by either increasing the syrup concentration at low epoxy concentrations or by decreasing the syrup concentration at high epoxy concentrations. The two values of interest are the 414 kPa and 552 kPa values. As with the low density shear tests, the samples were first tested bending and then in shear, thus the shear values may be low.

TABLE 36

| | Linear Expanion and Shear Strength | | | |
|---|---|---|---|---|
| | Linear Expansion % | | Shear Strength (kPA) | |
| Point | Rep 1 | Rep 2 | Rep 1 | Rep 2 |
| 1 | 0.53 | 0.20 | 601 | 355 |

TABLE 36-continued

Linear Expansion and Shear Strength

| Point | Linear Expansion % | | Shear Strength (kPA) | |
|---|---|---|---|---|
| | Rep 1 | Rep 2 | Rep 1 | Rep 2 |
| 2 | 0.33 | 0.00 | N/A | N/A |
| 3 | 0.20 | 0.26 | 128 | 128 |
| 4 | 0.26 | 0.00 | N/A | N/A |
| 5 | 0.46 | 0.13 | 178 | 162 |
| 6 | 0.46 | 0.13 | N/A | N/A |
| 7 | 0.33 | 0.26 | N/A | N/A |
| 8 | 0.26 | 0.33 | 287 | 424 |
| 9 | 0.26 | 0.26 | 108 | 83 |
| 10 | 0.00 | 0.20 | 672 | 342 |

High Density Board

High density boards were made and tested to find the modulus of rupture and modulus of elasticity. Due to limitations with the process, these boards were not properly pressed and thus, they lacked quality. Therefore, further production and testing of high density boards was stopped.

Urea—Formaldehyde

Low Density Board

Modulus of Rupture

The modulus of rupture data is given in Table 37. The value of interest is the 5.5 MPa value. The syrup concentration had a greater affect on the modulus of rupture than the urea-formaldehyde concentrations. This is because increasing the syrup concentration at a constant urea-formaldehyde concentration increases the modulus of rupture more than by increasing the urea-formaldehyde concentration at a constant syrup concentration.

TABLE 37

Modulus of Rupture and Elasticity

| Point | Modulus of Rupture (MPa) | | Modulus of Elasticity (GPa) | |
|---|---|---|---|---|
| | Rep 1 | Rep 2 | Rep 1 | Rep 2 |
| 1 | 5.7 | 4.3 | 2.9 | 2.0 |
| 5 | 7.9 | 5.1 | 3.6 | 2.3 |
| 8 | 4.5 | 4.9 | 2.2 | 2.4 |
| 10 | 0.8 | 0.9 | 0.3 | 0.5 |

Modulus of Elasticity

The analysis of the modulus of elasticity data (Table 37) showed both the syrup and the urea-formaldehyde concentrations to have an affect on the modulus of rupture. The value of interest is the 1.0 GPa value. An increase in urea-formaldehyde concentration at low syrup concentrations decrease the modulus of elasticity. While an increase in urea-formaldehyde concentration at high syrup concentrations will increase the modulus of elasticity.

Shear Strength

The shear strength data is given in Table 38. The shear strength data showed a greater affect due to the urea-formaldehyde than the syrup concentrations. By increasing the urea-formaldehyde concentration at a constant syrup concentration, the shear strength was increased more than by increasing th syrup concentration at a constant urea-formaldehyde concentration. The ANSI standard for shear strength is 138 kPa. Once again, the sample was first tested in bending and then in shear thus the shear values may be low.

TABLE 38

Linear Expansion and Shear Strength

| Point | Linear Expansion % | | Shear Strength (kPA) | |
|---|---|---|---|---|
| | Rep 1 | Rep 2 | Rep 1 | Rep 2 |
| 1 | 0.13 | 0.07 | 223 | N/A |
| 5 | 0.07 | 0.13 | 246 | 49 |
| 8 | 0.13 | 0.00 | N/A | N/A |
| 10 | 0.07 | 0.07 | N/A | N/A |

TABLE 39

Modulus of Rupture and Elasticity

| Point | Modulus of Rupture (MPa) | | Modulus of Elasticity (GPa) | |
|---|---|---|---|---|
| | Rep 1 | Rep 2 | Rep 1 | Rep 2 |
| 1 | 8.0 | 6.7 | 3.5 | 3.7 |
| 5 | 13.2 | 10.3 | 4.8 | 4.0 |
| 8 | 7.9 | 7.9 | 3.2 | 3.6 |
| 10 | 0.8 | 0.4 | 0.3 | 0.1 |

Medium Density Board

Modulus of Rupture

The modulus of rupture data is shown in Table 39. Of particular interest is the 11.0 MPa value. This value corresponds to the ANSI standard for grade 1-M-1 particle board. No points within the ranges of syrup and urea-formaldehyde used produced boards that met the ANSI standards for 1-M-2 and 1-M-3 particle boards. The modulus of rupture was affected by both the syrup and urea-formaldehyde concentrations with the syrup concentration having the greater affect. An increase in syrup concentration increased the modulus of rupture while an increase in urea-formaldehyde concentration decreased the modulus of rupture.

Modulus of Elasticity

The modulus of elasticity data is given in Table 39. The values of interest are the 2.2 GPa and 2.8 GPa contours. These are the values for grades 1-M-2 and 1-M-3 particle boards. All of the points within the ranges of syrup and urea-formaldehyde produced boards that met the ANSI standards for grade 1-M-1 particle board. The modulus of elasticity was affected more by the syrup concentration than by the urea-formaldehyde concentration. An increase in the syrup concentration increased the modulus of elasticity. The modulus of elasticity could also be increased by either decreasing the urea-formaldehyde concentration at low syrup concentrations or by increasing the urea-formaldehyde concentration at high syrup concentrations.

Shear Strength

The shear strength (internal bond) data in Table 40 showed an affect due to the urea-formaldehyde concentration and no affect due to the syrup concentration. Increasing the urea-formaldehyde concentration at a constant syrup concentration increased the shear strength. However, increasing the syrup concentration at a constant urea-formaldehyde concentration had little affect on the shear strength. None of the points within the ranges of syrup and urea-formaldehyde used produced boards that met the ANSI standards of 414 kPa or 552 kPa. Since the sample was first tested in bending and then in shear, these results may be low.

ECONOMIC ANALYSIS

To compare the cost of particle board made with the resins tested and the cost of commmercial particle board, the program PARVCOST (Forest Products Laboratory, Madison, Wis.) was used.

TABLE 40

Linear Expanion and Shear Strength

| | Linear Expansion % | | Shear Strength (kPA) | |
|---|---|---|---|---|
| Point | Rep 1 | Rep 2 | Rep 1 | Rep 2 |
| 1 | 0.07 | 0.13 | 137 | 190 |
| 5 | 0.07 | 0.20 | N/A | N/A |
| 8 | 0.07 | 0.07 | N/A | 68 |
| 10 | 0.07 | 0.07 | N/A | N/A |

This program allowed the resin cost and concentration to be varied while keeping other costs constant. A 7 percent urea-formaldehyde resin level was used as the control at a cost of $17/m3 for low density boards and $19/m3 for medium density boards. The values used for the costs were $3.34/kg for the Epon 828, $0.04/kg for the syrup and $0.02/kg for the urea-formaldehyde.

Epon 828

Low Density Board

The PARVCOST program was used to determine the production costs for the 10 points used (Table 31). SAS analysis was then used to generate the response surfaces from these 10 points. Regression analysis was used to determine the equations for the response surfaces. SAS analysis showed that the epoxy concentration had a significant affect (P 0.05) on cost. There was no significant affect (P 0.05) due to the syrup concentration. FIG. 44, a contour plot of the cost data, shows that all of the epoxy-syrup combinations cost more than the 7 percent urea-formaldehyde board.

The minimum cost board meeting the ANSI standards for modulus of rupture contains 6.4 percent syrup and no epoxy. The cost would be $18/m3.

Medium Density Board

As with the low density boards, the epoxy concentration showed a significant affect (P 0.05) on cost according to SAS analysis. Syrup concentration showed no significant affect (P 0.05) on cost. Again, all of the epoxy-syrup combinations cost more than the 7 percent urea-formaldehyde board.

For grades 1-M-1, 1-M-2 and 1-M-3 particle board, the syrup-epoxy combinations that meet the ANSI standards for modulus of rupture and shear strength have the following prices: (1) the minimum cost board for grade 1-M-1 particle board contained 7.4 percent syrup and 3.2 percent epoxy and cost $93/m3; (2) for grade 1-M-2 particle board, the minimum cost board contained 9.7 percent syrup and 3.4 percent epoxy and cost $98/m3; (3) the minimum cost board for grade 1-M-3 particle board costs $14/m3 and contains 10.8 percent syrup and 5.3 percent epoxy.

UREA-FORMALDEHYDE

Low Density Board

SAS analysis of the cost data showed the syrup concentration had a significant affect (P 0.05) on the cost. The urea-formaldehyde concentration showed no significant affect (P 0.05) on cost. All combinations of syrup and urea-formaldehyde have costs higher than the 7 percent urea-formaldehyde board.

The boards that met the ANSI standards for modulus of rupture, modulus of elasticity and shear strength have syrup-urea-formaldehyde combinations at a minimum cost of $19/m3 and contains 9.0 percent and 5.5 percent urea-formaldehyde.

Medium Density Board

Like the low density boards, the medium density urea-formaldehyde syrup boards are all hight cost than the 7 percent urea-formaldehyde board. The SAS analysis of data showed the syrup concentration had significant affect (P 0.05) on the cost with no significant affect (P 0.05) due to the urea-formaldehyde concentrator. Because no syrup urea-formaldehyde combination produced a board that met the ANSI standards for modulus of rupture, modulus of elasticity, shear strength and linear expansion, no minimum cost board was found.

CONCLUSIONS

Particle boards were produced by blending aspen wood chips with a resin made of corn protein syrup, water and Epon 828 or urea-formaldehyde. Mixtures were then pressed into low and medium density boards at 232 degrees Celsius for 11 or 12 minutes.

Epon 828

Particle boards can be made that meet the ANSI standards for modulus of elasticity, modulus of rupture, shear strength and linear variation using a protein resing consisting of corn protein syrup and Epon 828. Of these requirements, the modulus of elasticity placed no limit on the amount of resin in the boards. The modulus of rupture placed a minimum of 6.4 percent syrup for low density and 7.4 percent syrup for medium density boards. For the medium density boards, the shear strength (internal bond) requirement gave a minimum of 3.2 percent Epon 828 in the board. However, the shear strength requirement placed no minimum requirement for the low density boards. For the low density boards, the linear expansion requirement placed a limit on the maximum amount of syrup in the boards at low epoxy concentrations. This maximum was 10.3 percent with an expsy concentration of zero. The linear expansion requirement placed no restrictions on the syrup or epoxy concentration for medium density boards.

To meet the second objective of this experiment was to produce the least cost board. When using the Epon 828, the cost of the boards was higher than the cost of a 7 percent urea-formaldehyde board. However, low density boards were produced that contained no Epon 828 thus making them price competitive. The cost of the medium density boards with Epon 828 were five to seven times the cost of the 7 percent urea-formaldehyde boards due to the 3.2 percent to 5.3 percent Epon 828 that was required.

Urea-Formaldehyde

Particle board can be produced that meet the ANSI standards for modulus of rupture, modulus of elasticity, shear strength and linear expansion for grade 1-L-1 particle board using a resin made up of syrup and urea-formaldehyde. The minimum amount of syrup in the board was restricted to 9 percent by the modulus ofr rupture with the shear strength limiting the minimum amount of urea-formaldehyde to 0.7 percent. The modulus of elasticity and the linear expansion had no restrictions on the amount of resin used. For the medium density boards, it was found that no boards met the shear strength requirements. The requirement for modulus of rupture was only met for grade 1-M-1 particle board with the requirement for modulus of elasticity met for grades 1-M-1, 1-M-2 and 1-M-3 particle board. All boards produced met the requirement for linear expansion.

For the second objective, the boards produced were still more expensive than the boards produced with just 7 percent urea-formaldehyde for the resin. However, since the price of the syrup and the urea-formaldehyde were close, the minimum cost board that met the ANSI standards for low density particle board was only $2/m3 more expensive than the 7 percent urea-formaldehyde board. No cost data for the minimum cost medium density board was found since no board met the ANSI standards of objective one.

Oxirane

EXAMPLE 55

Thirty-three parts of milled soybean were mixed with 100 parts of wood chips, 8 parts of oxirane (Ciba-Geigy (9138)) obtainable from Ciba-Geigy Corporation. Sixty-six parts of water was added to the bend.

The boards had a specific gravity of 0.9522 and were cured at a pressure of 200 PSI, a temperature of 325 degrees Fahrenheit for 45 minutes. Three samples were tested and they showed for the first sample a modulus of rupture of 782 PSI and a modulus of elasticity of 245,725 PSI; for the second sample, a modulus of rupture of 750 PSI and a modulus of elasticity of 188,750 PSI; and for the third sample, a modulus of rupture of 710 and a modulus of elasticity of 188,404.

EXAMPLE 56

Various quantities of epoxide resin were added to 100 parts of fiber, 50 parts of defatted bean and 50 parts of water. The amount tried were 5, 10, 15, 20, 25, 30, 40, 60 and 80 parts (see Table 41). All samples were made to achieve equal specific gravities and were cured at 165 degrees Celsius for 5 hours. As shown in Table 41, the optimized content was 20 parts of epoxy resin to 50 parts of defatted bean. Additional epoxy after optimum concentration degradation due to an imbalance in the stoichiometric ratio between oxirane and polypeptides. Inasmuch as the resin cure utilizes oxirane and protein, this optimal point likely relates to chemical stoichiometry, which in turn maximizes crosslink extent and minimizes plasticizing effects of excess reactants that occur at higher and lower levels of oxirane content.

TABLE 41

Effect of Increasing Oxirane on Modulus

| Sawdust lb | Water lb | Defatted Bean lb | Oxirane lb | Elastic MOD (PSI) | Rupture MOD (PSI) |
|---|---|---|---|---|---|
| 100 | 50 | 50 | 5 | 172,526 | 1821 |
| 100 | 50 | 50 | 10 | 175,640 | 1860 |
| 100 | 50 | 50 | 15 | 186,048 | 1985 |
| 100 | 50 | 50 | 20 | 231,743 | 2280 |
| 100 | 50 | 50 | 25 | 200,035 | 1830 |
| 100 | 50 | 50 | 30 | 168,254 | 1754 |
| 100 | 50 | 50 | 40 | 149,618 | 1707 |
| 100 | 50 | 50 | 60 | 139,790 | 1503 |
| 100 | 50 | 50 | 80 | 117,552 | 1193 |

EXAMPLE 57

The effect of increasing the curing time period on mechanical properties used 100 parts of sawdust, 50 parts of defatted bean and 50 parts of water and is presented by the data of Table 42. Hours studied were 1, 2, 3, 4, 4.5, 5, 6 and 7 hours. Speciments were cured at 165 degrees Celsius with 20 parts of oxirane. Table 42 reports the moduli of elasticity and rupture achieved. The optimized cure time is 5 hours for 20 parts of oxirane. Data do show a correlation between formulation and modulus. The specimen and mold were heated in an electrical oven.

TABLE 42

Effect of Increasing Cure Time on Mechanical Properties

| Sawdust lb | Water lb | Defatted Bean lb | Time hr | Elastic MOD (PSI) | Rupture MOD (PSI) |
|---|---|---|---|---|---|
| 100 | 50 | 50 | 1 | 79,805 | 1095 |
| 100 | 50 | 50 | 2 | 144,458 | 1693 |
| 100 | 50 | 50 | 3 | 168,800 | 1908 |
| 100 | 50 | 50 | 4 | 190,241 | 2070 |
| 100 | 50 | 50 | 4.5 | 223,095 | 2232 |
| 100 | 50 | 50 | 5 | 227,215 | 2460 |
| 100 | 50 | 50 | 6 | 186,021 | 1824 |
| 100 | 50 | 50 | 7 | 168,787 | 1514 |

It is estimated that at least one half hour is required to warm the mold. If appreciable evaporation occurs, it is likely that the actual temperature of the mold is less than 165 degrees Celsius for a considerable period of time.

Effect of Water Content

Various quantities of water were added to 100 parts of fiber, 50 parts of defatted bean and 20 parts of oxirane prior to the cure to study the effect of this variable. The amount of water formulated as 10, 20, 30, 40, 50 and 60 parts. Data of Table 43 provides a trend and show that the highest modulus of elasticity was achieved with a water content of 50 parts, as is the modulus of rupture. If more than 50 parts of water were added, the moduli of elasticity and rupture became lower. Water during the cure likely softens the fiber, increasing the strength of the interface between cellulosic materials and the resin matrix.

TABLE 43

| Effect of Cure Temperature and Time on Modulus (PSI) | | | |
|---|---|---|---|
| Temperature °C. | Cure Time Hour | Elastic MOD (PSI) | Rupture MOD (PSI) |
| 195 | 1 | 243,778 | 2501 |
| 195 | 2 | 205,884 | 2119 |
| 195 | 3 | 196,725 | 1719 |
| 195 | 4 | 155,780 | 1743 |
| 180 | 2 | 247,061 | 2840 |
| 180 | 3 | 196,168 | 2009 |
| 180 | 4 | 200,603 | 2081 |
| 180 | 5 | 188,516 | 1889 |
| 170 | 3 | 225,924 | 2543 |
| 170 | 4 | 229,588 | 2418 |
| 170 | 5 | 219,429 | 2416 |
| 170 | 6 | 197,438 | 2183 |
| 140 | 5 | 146,317 | 2086 |
| 140 | 6 | 182,934 | 2076 |
| 140 | 7 | 236,160 | 2422 |
| 140 | 8 | 243,496 | 2501 |

| Effect of Increasing Water on Modulus | | | | | |
|---|---|---|---|---|---|
| Sawdust | Water | Defatted Bean | Oxirane | Elastic MOD | Rupture |

TABLE 43-continued

| lb | lb | lb | lb | (PSI) | MOD (PSI) |
|-----|-----|-----|-----|---------|-----------|
| 100 | 10  | 50  | 20  | 39,431  | 435       |
| 100 | 20  | 50  | 20  | 82,920  | 700       |
| 100 | 30  | 50  | 20  | 139,462 | 1463      |
| 100 | 40  | 50  | 20  | 216,926 | 2148      |
| 100 | 50  | 50  | 20  | 227,215 | 2460      |
| 100 | 60  | 50  | 20  | 169,552 | 2025      |

Effect of Cure Temperature and Time

Data of Table 43 shows the results of cure time and temperature on mechanical properties. The formulation were for 100 parts of fiber, 20 parts of oxirane, 50 parts of defatted bean and 50 parts of water. The maximum observed moduli of elasticity and rupture were obtained at a temperature of 195 degrees Celsius when the cure time was 1 hour. At the cure temperature of 180 degrees Celsius, cure time of 2 hours yielded observed maximum. At a temperature of 170 degrees Celsius, a cure time between 3 and 4 hours is recommended, whereas for a cure temperature of 140 degrees Celsius, a cure time of 8 hours is favorable. Reaction rates are expected to be temperature dependent. Table 43 shows that the high modulus of elasticity was achieved with less cure time when the cure temperature was above 165 degrees Celsius. This means for oven temperature above 165 degrees Celsius, a decrease in cure time improves mechanical performance. At 140 degrees Celsius, more than 5 hours is required to complete the temperature dependent reactions. Long cure times and high temperatures may damage temperature sensitive components via macromolecular degradation. Severe charring on the surface of the particle board can occur. Optimal conditions have not necessarily been observed. Since such will be dependent on oven type, mold design and operating conditions. However, the data clearly demonstrate that a resin matrix can be cured rapidly, yielding a quality product. Alternate energy sources can potentially cure this resin system in very short time. Energy transfer is likely a limiting constraint in an electricity heater, convection oven.

Figure 3:
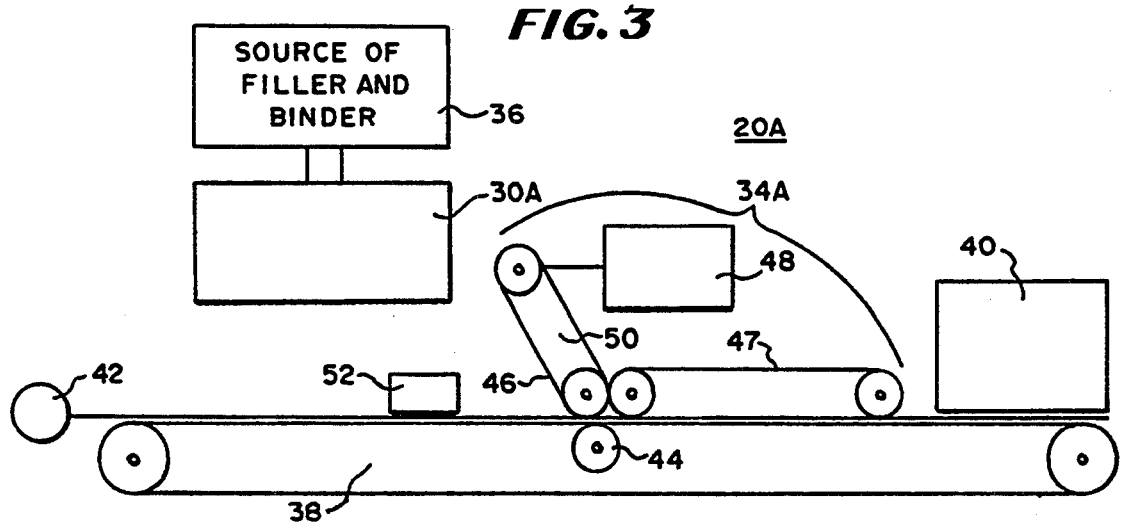
FIG. 3 is another embodiment of the process of using the binder shown in FIG. 2.

In FIG. 3, there is shown equipment 20A for forming composition board having a source 36 of material to be formed into the board which may include a binder and a filler. The apparatus also includes the mold 30A, a conveyor apparatus 38, a press 34A and a heat tunnel 40. This equipment is positioned so that the feedstock from the source 36 is applied to a mold 30A and from there on to the conveyor 38 which carries it underneath the mold 30A for applying pressure to enhance or articulate polymerization. The pressed board is then carried under a heat tunnel 40 which cures it and subsequently, cuts it into the appropriate lengths.

The mold 30A is for a continuous conveyor application and includes pressure rollers 44 and 46 with the roller 44 being positioned beneath the top run of the continuous belt of the conveyor 38 and the roller 46 being positioned above the top run of the continuous belt. The rollers 44 and 46 are compressed against each other and moved either by the conveyor 38 or by a separate motor 48 which may drive one of the rollers such as the roller 46 through another endless belt or chain 50.

The board, after passing between the two presses, is slightly released and then passes into the bite of the two endless belts 38 and 47, with the bottom run of the endless belt 47 and the top run of the conveyor 38 being positioned against each other to press against the board as it moves there between. A heater 52 is positioned immediately before the pressure rollers 44 and 46 to heat the board to a sufficient temperature so that the pressure created in the board by the pressure as it moves the rollers and the added heat from the heater 52 are sufficient to cause polymerization. The conveyor 38 can be of any conventional type utilizing an endless belt and may be adapted to draw a holding fabric from a roll 42 to form a base for the board.

In forming articles, the binder operates in one of two different modes or in both modes at the same time. In one mode, it penetrates the surface and then polymerizes to establish bonds between the two surfaces, or in a second mode it encompasses the surfaces and forms bonds or forms chemical linkages with the surface. If the binder is principally a protein, step growth polymerization takes place at the peptide linkage but other reactions may occur with other compounds at the amide groups or at the carboxyl groups. Polymerization can be accomplished to some extent by heat and pressure but also may utilize catalysts or other reactants to bind at the peptide linkages. Oxirane additives have been found to be a superior additive to bind at the amine groups.

If substantial lipids form part of the binder, the saturated lipids are converted by catalysts or initiators to a more reactive form and the lipids are polymerized by forming chain linkages from lipid to lipid or directly reacting the lipids together. In the preferred embodiment this conversion is by initiators in an addition polymerization reaction sometimes called chain-reaction or chain growth polymerization. The temperature of the composition board or other structure is raised either by pressure or by pressure and added heat to reach the decomposition temperature of the initiator, if any, incorporated in the composite board; otherwise, it is raised to a level above 300 degrees Fahrenheit. When an initiator is used, the temperature will be at the threshold or decomposition temperature of the initiator which will differ from initiator to initiator but will be generally above 80 degrees Fahrenheit.

As can be understood from the above description, the binder of this invention has the advantages of being inexpensive and forming a relatively strong adhesive. The composition board has the advantages of being inexpensive and using waste materials. Moreover, a variety of composition boards can be formed depending on the raw materials available and the cost to be incurred in the composition board or other structural article.

Although a preferred embodiment of the invention has been described with some particularity, many modifications and variations of the preferred embodiment may be made without deviating from the invention. Therefore, it is to be understood that, within the scope of the appended claims, the invention may be practiced other than as specifically described.

We claim:

1. A method of making a binder comprising the steps of:
   obtaining a naturally occurring agricultural product containing plant protein not processed to remove carbohydrates so that carbohydrates are at least 5 percent of the protein;
   grinding the material to a mesh of at least 18;

storing the material so as to not be exposed excessively to elevate conditions that cause reaction; and adding a compound containing a group that reacts with an amide group of the plant protein to increase the polymerization of protein.

2. A method of making a binder comprising the steps of:

obtaining a naturally occurring agricultural product containing plant protein not processed to remove carbohydrates so that carbohydrates are at least 5 percent of the protein;

grinding the material to a mesh of at least 18; and storing the material so as to not be exposed excessively to elevated conditions that cause reaction;

the step of obtaining a naturally occurring agricultural product including the step of obtaining a naturally occurring agricultural product containing substantial lipids and further comprising the step of adding an initiator for the initiation of chain growth in the lipids.

3. A method according to claim 1 in which the step of obtaining a naturally occurring agricultural product includes the step of obtaining seeds from the group consisting of a selected one of a cereal grass, buckwehat or a leguminous plant.

* * * * *